United States Patent
Suzuki et al.

(10) Patent No.: US 12,293,881 B2
(45) Date of Patent: May 6, 2025

(54) ELECTROLYTIC CAPACITOR AND METHOD FOR PRODUCING SAME

(71) Applicant: Panasonic Intellectual Property Management Co., Ltd., Osaka (JP)

(72) Inventors: Shinya Suzuki, Kyoto (JP); Masaya Kiso, Hyogo (JP); Kazuaki Aoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 261 days.

(21) Appl. No.: 17/759,915

(22) PCT Filed: Feb. 19, 2021

(86) PCT No.: PCT/JP2021/006496
§ 371 (c)(1),
(2) Date: Aug. 1, 2022

(87) PCT Pub. No.: WO2021/172236
PCT Pub. Date: Sep. 2, 2021

(65) Prior Publication Data
US 2023/0062760 A1    Mar. 2, 2023

(30) Foreign Application Priority Data

Feb. 28, 2020  (JP) .................................. 2020-034476
Dec. 28, 2020  (JP) .................................. 2020-219271

(51) Int. Cl.
*H01G 9/15*     (2006.01)
*H01G 9/012*    (2006.01)
(Continued)

(52) U.S. Cl.
CPC ............... *H01G 9/15* (2013.01); *H01G 9/012* (2013.01); *H01G 9/10* (2013.01); *H01G 9/0029* (2013.01); *H01G 9/025* (2013.01); *H01G 9/07* (2013.01)

(58) Field of Classification Search
None
See application file for complete search history.

(56) References Cited

U.S. PATENT DOCUMENTS 5,184,287 A   2/1993  Taniguchi
6,185,091 B1  2/2001  Tanahashi et al.
(Continued)

FOREIGN PATENT DOCUMENTS

JP      1-367212        12/1992
JP      11-288846 A     10/1999
(Continued)

OTHER PUBLICATIONS

International Search Report of PCT application No. PCT/JP2021/006496 dated May 11, 2021.
(Continued)

Primary Examiner — Eric W Thomas
(74) Attorney, Agent, or Firm — Rimon P.C.

(57) ABSTRACT

An electrolytic capacitor includes exterior body and an element stack body including a plurality of capacitor elements. Each of the plurality of capacitor elements includes an anode body, a dielectric layer, and a cathode part covering at least a part of the dielectric layer. The exterior body includes a first principal surface, a second principal surface intersecting the first principal surface, a third principal surface opposite to the first principal surface, and a fourth principal surface opposite to the second principal surface. In at least one first capacitor element among the plurality of capacitor elements, an end surface of an end of the anode (Continued)

body is exposed from the exterior body at least on first principal surface to be electrically connected to a first external electrode. And an end surface of an end of the cathode part is exposed from the exterior body at least on second principal surface to be electrically connected to a second external electrode.

26 Claims, 33 Drawing Sheets

(51) Int. Cl.
*H01G 9/10* (2006.01)
*H01G 9/00* (2006.01)
*H01G 9/025* (2006.01)
*H01G 9/07* (2006.01)

(56) References Cited

U.S. PATENT DOCUMENTS

| | | | |
|---|---|---|---|
| 6,259,348 B1 * | 7/2001 | Kuriyama | H01H 85/0411 337/248 |
| 2003/0184955 A1 * | 10/2003 | Matsumoto | H01G 9/042 361/523 |
| 2005/0286210 A1 * | 12/2005 | Ishida | H01G 9/012 361/516 |
| 2006/0262487 A1 | 11/2006 | Kurita et al. | |
| 2009/0154067 A1 | 6/2009 | Kurita et al. | |
| 2010/0165547 A1 | 7/2010 | Kuranuki et al. | |
| 2010/0214038 A1 | 8/2010 | Kurita et al. | |
| 2016/0042873 A1 * | 2/2016 | Kurita | H01G 9/14 361/528 |
| 2019/0122827 A1 * | 4/2019 | Furukawa | H01G 9/15 |

FOREIGN PATENT DOCUMENTS

| | | |
|---|---|---|
| JP | 2003-243267 A | 8/2003 |
| JP | 2008-078370 | 4/2008 |
| JP | 2009-123938 | 6/2009 |
| JP | 2011-035057 | 2/2011 |
| JP | 2011-146548 | 7/2011 |
| JP | 2011-244019 A | 12/2011 |
| WO | 2009/028183 | 3/2009 |

OTHER PUBLICATIONS

English Translation of Chinese Office Action dated Aug. 1, 2024 for the related Chinese Patent Application No. 202180015742.X.

* cited by examiner

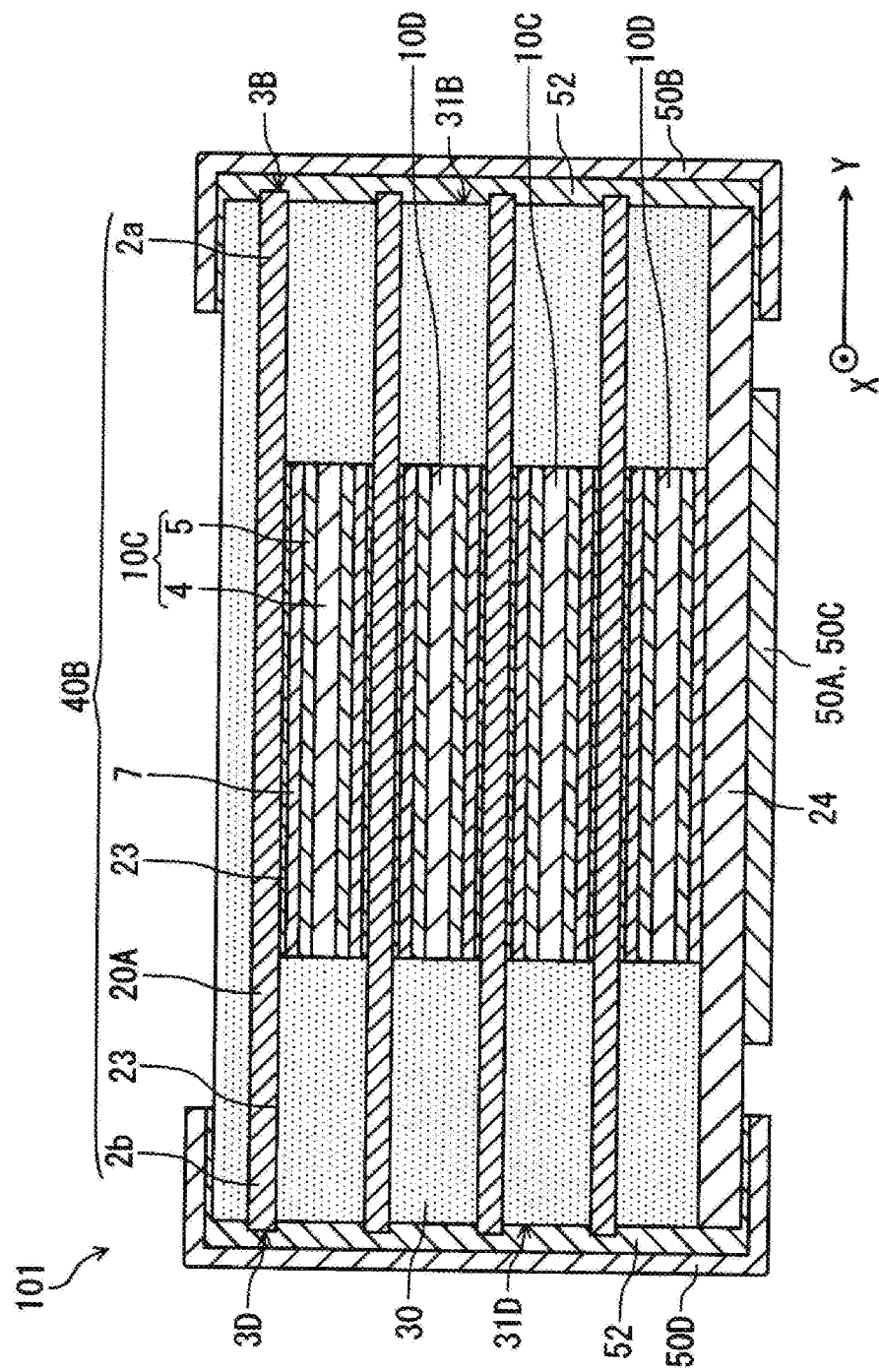

ELECTROLYTIC CAPACITOR AND METHOD FOR PRODUCING SAME

CROSS-REFERENCE TO RELATED APPLICATIONS

This application is a U.S. national stage application of the PCT International Application No. PCT/JP2021/006496 filed on Feb. 19, 2021, which claims the benefit of foreign priority of Japanese patent application No. 2020-034476 filed on Feb. 28, 2020 and Japanese patent application No. 2020-219271 filed on Dec. 28, 2020, the contents all of which are incorporated herein by reference.

TECHNICAL FIELD

The present disclosure relates to an electrolytic capacitor and a method for producing the electrolytic capacitor.

BACKGROUND

An electrolytic capacitor includes a capacitor element, an exterior body that seals the capacitor element, and external electrodes electrically connected to an anode side and a cathode side of the capacitor element, respectively. The capacitor element includes an anode body having a first part (also referred to as an anode lead-out part) including a first end and a second part (also referred to as a cathode formation part) including a second end, a dielectric layer formed on a surface of at least the second part of the anode body, and a cathode part covering at least a part of the dielectric layer.

Unexamined Japanese Patent Publication No. 2008-78370 proposes a solid electrolytic capacitor including an element stack body in which flat plate-shaped capacitor elements each having an anode electrode part and a cathode electrode part are stacked in even units such that a plurality of the anode electrode parts are alternately disposed in positions opposite to each other. The solid electrolytic capacitor of Unexamined Japanese Patent Publication No. 2008-78370 further includes a pair of anode common terminals joined so as to integrally combine the anode electrode parts located at both ends of the element stack body, a cathode common terminal joined to a lower surface of the cathode electrode part located at a center of the element stack body, a pair of anode terminals respectively provided on lower surfaces of the pair of anode common terminals, and a pair of cathode terminals joined to the cathode common terminal. The pair of anode terminals are connected by a plate-shaped inductor part, and the pair of cathode terminals are respectively joined to both ends of the lower surface of the cathode common terminal in a direction intersecting the inductor part. Unexamined Japanese Patent Publication No. 2008-78370 proposes lowering of the equivalent series inductance (ESL) of an electrolytic capacitor with this configuration.

An electrolytic capacitor according to an aspect of the present disclosure includes an element stack body including a plurality of capacitor elements, an exterior body that seals the element stack body, a first external electrode, and a second external electrode. Each of the plurality of capacitor elements includes an anode body having a porous part on a surface of the anode body, a dielectric layer disposed on at least a part of a surface of the porous part, and a cathode part covering at least a part of the dielectric layer. The exterior body includes a first principal surface, a second principal surface intersecting the first principal surface, a third principal surface opposite to the first principal surface, and a fourth principal surface opposite to the second principal surface. In at least one first capacitor element among the plurality of capacitor elements, an end surface of an end of the anode body is exposed from the exterior body at least on the first principal surface to be electrically connected to the first external electrode, and an end surface of an end of the cathode part is exposed from the exterior body at least on the second principal surface to be electrically connected to the second external electrode.

A method for producing an electrolytic capacitor according to another aspect of the present disclosure is a method for producing an electrolytic capacitor, the electrolytic capacitor including an element stack body including a plurality of capacitor elements each including an anode body having a porous part on a surface of the anode body, a dielectric layer formed on at least a part of a surface of the porous part, and a cathode part covering at least a part of the dielectric layer. The method includes a step of obtaining an element assembly in which a plurality of element stack bodies are arrayed on a plane perpendicular to a stacking direction, a step of dividing the element assembly into the plurality of element stack bodies, each of the plurality of element stack bodies being the element stack body, and a step of electrically connecting an end of the anode body of the element stack body to a first external electrode and electrically connecting an end of the cathode part to a second external electrode. The step of obtaining the element assembly includes (i) a step of preparing an anode foil including the porous part formed on a surface of the anode foil, (ii) a step of forming the dielectric layer on a surface of the anode foil, (iii) a step of forming a first opening the anode foil, (iv) a step of forming a solid electrolyte layer in a first region of the anode foil, (v) a step of preparing a cathode foil processed into a shape having a second region partially facing the first region, and (vi) a step of alternately stacking the anode foil and the cathode foil. Each of the first region of the anode foil and the second region of the cathode foil has an arrangement pattern including a periodic pattern in which a unit pattern is periodically repeated in at least one of a first direction or a second direction intersecting the first direction. The unit pattern of the first region includes region $A_1$ located at a center in the first direction and region $A_2$ extending in the first direction from region $A_1$. The unit pattern of the second region includes region $A_3$ corresponding to region $A_1$ of the anode foil and region $A_4$ extending in the second direction from region $A_3$.

The present disclosure enables the electrolytic capacitor to have high capacitance while maintaining a low ESL.

BRIEF DESCRIPTION OF THE DRAWINGS

FIG. 8B is a sectional view schematically illustrating a structure of the solid electrolytic capacitor according to the second exemplary embodiment of the present disclosure.

DESCRIPTION OF EMBODIMENT

Figure 1A:
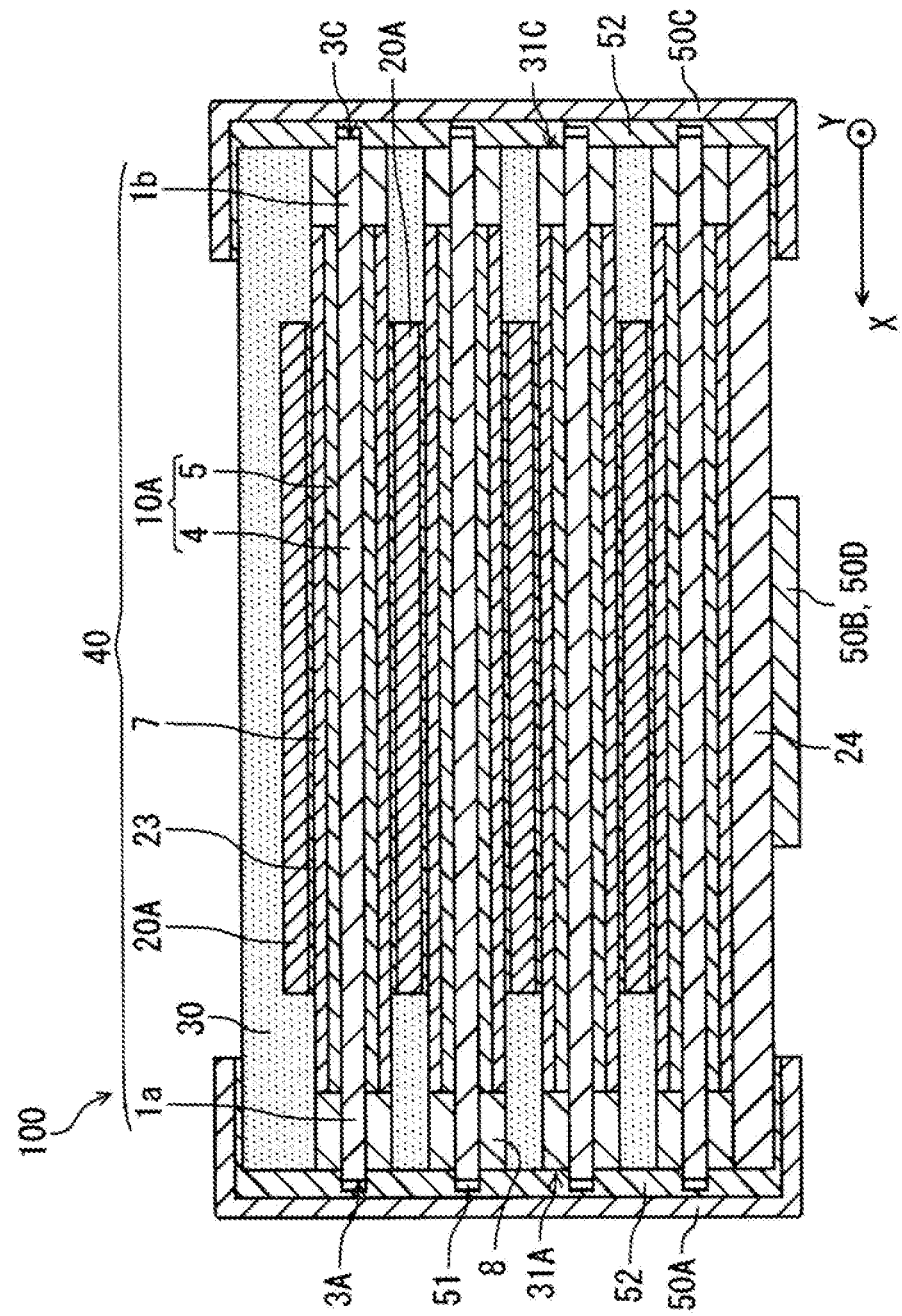
FIG. 1A is a sectional view schematically illustrating a structure of an electrolytic capacitor according to an exemplary embodiment of the present disclosure.

Prior to the description of exemplary embodiments, problems in the conventional technology will be briefly described below.

The solid electrolytic capacitor described in Unexamined Japanese Patent Publication No. 2008-78370, in which the anode electrode parts and the external electrodes are electrically connected via the anode common terminals, is limited in space to be occupied by the capacitor elements because of the space occupied by the anode common terminals and is difficult to increase the capacitance of the capacitor.

In view of the above problems, the present disclosure provides an electrolytic capacitor capable of achieving high capacitance while maintaining a low ESL, and a method for producing the electrolytic capacitor.

[Electrolytic Capacitor]

An electrolytic capacitor according to the present exemplary embodiment includes an element stack body including a plurality of capacitor elements, an exterior body that seals the element stack body, a first external electrode, and a second external electrode. Each of the plurality of capacitor elements includes an anode body having a porous part on a surface of the anode body, a dielectric layer disposed on at least a part of a surface of the porous part, and a cathode part covering at least a part of the dielectric layer. At least a part of an end of the anode body and at least a part of an end of the cathode part are exposed from the exterior body, and are electrically connected to the respective external electrodes at end surfaces of the ends exposed from the exterior body, whereby the electrolytic capacitor having the element stack body is formed.

The exterior body includes a first principal surface, a second principal surface intersecting the first principal surface, a third principal surface opposite to the first principal surface, and a fourth principal surface opposite to the second principal surface. In the plurality of capacitor elements, a plurality of the ends of the anode bodies may be exposed from the exterior body on at least one of the principal surfaces, and a plurality of the ends of the cathode parts may be exposed from the exterior body on at least one of the principal surfaces. Hereinafter, the end surfaces of the ends of the anode body and the cathode part on the first principal surface to the fourth principal surface of the exterior body are referred to as first end surface to fourth end surface, respectively.

In at least one first capacitor element among the plurality of capacitor elements, an end surface of an end of the anode body is exposed from the exterior body at least on the first principal surface to be electrically connected to the first external electrode (anode electrode), and an end surface of an end of the cathode part is exposed from the exterior body at least on the second principal surface to be electrically connected to the second external electrode (cathode electrode). That is, the end of the anode body and the end of the cathode part are connected to the respective external electrodes on the principal surface that intersect each other. In this case, the first external electrode and the second external electrode may be provided on the respective principal surfaces that intersect each other. This configuration enables the separation distance between the first external electrode and the second external electrode to be shortened and the ESL to be reduced as compared with the conventional configuration in which the first external electrode and the second external electrode are provided on the respective principal surfaces that face each other.

In the present exemplary embodiment, the end of the anode body includes a pair of first ends opposite to each other in a first direction. The end of the cathode part includes a pair of second ends opposite to each other in a second direction intersecting the first direction. In this case, in the plurality of capacitor elements, first end surface A that is one end surface of the pair of first ends may be exposed from the exterior body on the first principal surface of the exterior body, and/or third end surface A that is the other end surface of the pair of first ends may be exposed from the exterior body on the third principal surface of the exterior body. Second end surface A that is one end surface of the pair of second ends may be exposed from the exterior body on the second principal surface of the exterior body, and/or fourth end surface A that is the other end surface of the pair of second ends may be exposed from the exterior body on the fourth principal surface of the exterior body. In at least one first capacitor element among the plurality of capacitor elements, first end surface A is exposed from the exterior body to be electrically connected to the first external electrode (anode electrode), and second end surface A is exposed from the exterior body to be electrically connected to the second external electrode (cathode electrode).

In the first capacitor element, third end surface A may be exposed from the exterior body to be electrically connected to the third external electrode (anode electrode). That is, the first end may be connected to the external electrode (anode electrode) on both of the principal surfaces facing each other. In this case, both of the first external electrode and the third external electrode may be provided separately on the respective principal surfaces that face each other. In this case, since an anode terminal is constituted by a plurality of separated external electrodes, the ESL can be further reduced.

Either one of the first external electrode and the third external electrode may be connected to an anode terminal of an external circuit board, or both of them may be connected to the anode terminal. By providing the first external electrode and the third external electrode, the degree of freedom in mounting the electrolytic capacitor on the substrate can be increased. By connecting both the first external electrode and the third external electrode to the anode terminal of the external circuit board, an ESR can be reduced and the ESL can be further reduced.

In the first capacitor element, fourth end surface A may be exposed from the exterior body to be electrically connected to the fourth external electrode (cathode electrode). That is, the second end may be connected to the external electrode (cathode electrode) on both of the principal surfaces facing each other. In this case, both of the second external electrode and the fourth external electrode may be provided separately on the respective principal surfaces that face each other. In this case, since a cathode terminal is constituted by a plurality of separated external electrodes, the ESL can be further reduced.

Either one of the second external electrode and the fourth external electrode may be connected to a cathode terminal of the external circuit board, or both of them may be connected to the cathode terminal. By providing the second external electrode and the fourth external electrode, the degree of freedom in mounting the electrolytic capacitor on the substrate can be increased. By connecting both the second external electrode and the fourth external electrode to the cathode terminal of the external circuit board, the ESR can be reduced and the ESL can be further reduced.

The first to fourth external electrodes may be provided along the first to fourth principal surfaces of the exterior body, respectively. Of these external electrodes, the first external electrode and the third external electrode may constitute the anode electrodes of the electrolytic capacitor. The second external electrode and the fourth external electrode may constitute the cathode electrodes of the electrolytic capacitor. In each of the plurality of capacitor elements constituting the element stack body, at least one of the pair of first ends is electrically connected to the first external electrode or the third external electrode, and at least one of the pair of second ends is electrically connected to the second external electrode or the fourth external electrode.

The plurality of capacitor elements may include a second capacitor element in which first end surface B is not exposed from the exterior body. In the second capacitor element, first end surface B is not exposed from the exterior body and is not electrically connected to the first external electrode, but third end surface B is exposed from the exterior body and electrically connected to the third external electrode.

In this case, in the element stack body, the first capacitor element and the second capacitor element may be alternately stacked. In this case, the first capacitor element in which third end surface A is not exposed from the exterior body and the first end is electrically connected only to the first external electrode and the second capacitor element in which the first end is electrically connected only to the third external electrode may be alternately stacked. As described above, since the first external electrode and the third external electrode are provided on the respective surfaces of the exterior body facing each other, the direction of the current flowing through the anode body is reversed between the first capacitor element and the second capacitor element. Consequently, the magnetic flux generated in the element stack body decreases because the direction of the magnetic field generated by the current is different. This configuration can further reduce the ESL.

In particular, when the first capacitor element and the second capacitor element are alternately stacked, the magnetic flux generated in the element stack body may decrease effectively. The ESL thus may be reduced effectively. The number of the first capacitor elements and the number of the second capacitor elements may be the same. When the number of the first capacitor elements is equal to the number of the second capacitor elements, the magnetic field generated by the current flowing through the anode body of the first capacitor element and the magnetic field generated by the current flowing through the anode body of the second capacitor element cancel each other without overs or shorts between strengths in the generated magnetic fields, and the magnetic flux generated in the element stack body decreases. The ESL is therefore likely to be reduced.

In the second capacitor element, the second end is electrically connected to at least one of the second external electrode or the fourth external electrode. In the second capacitor element, either one of second end surface B and fourth end surface B may be exposed from the exterior body (and the other is not exposed from the exterior body) to electrically connect the second external electrode or the fourth external electrode to the second end, or both of second end surface B and fourth end surface B may be exposed from the exterior body to electrically connect the second external electrode and the fourth external electrode to the second end.

The plurality of capacitor elements may include a third capacitor element in which second end surface C is not exposed from the exterior body. In the third capacitor element, second end surface C is not exposed from the exterior body and is not electrically connected to the second external electrode, but fourth end surface C is exposed from the exterior body to be electrically connected to the fourth external electrode.

In this case, in the element stack body, the first capacitor element and the third capacitor element may be alternately stacked. In this case, the first capacitor element in which fourth end surface A is not exposed from the exterior body and the second end is electrically connected only to the second external electrode and the third capacitor element in which the second end is electrically connected only to the fourth external electrode may be alternately stacked. As described above, since the second external electrode and the fourth external electrode are provided on the respective surfaces of the exterior body facing each other, the direction of the current flowing through the cathode part is reversed between the first capacitor element and the third capacitor element. Consequently, the magnetic flux generated in the element stack body decreases because the direction of the magnetic field generated by the current is different. This configuration can further reduce the ESL.

In particular, when the first capacitor element and the third capacitor element are alternately stacked, the magnetic flux generated in the element stack body may decrease effectively. The ESL thus may be reduced effectively. The number of the first capacitor elements and the number of the third capacitor elements may be the same. When the number of the first capacitor elements is equal to the number of the second third capacitor elements, the magnetic field generated by the current flowing through the cathode part of the first capacitor element and the magnetic field generated by the current flowing through the cathode part of the third capacitor element cancel each other without overs or shorts between strengths in the generated magnetic fields, and the magnetic flux generated in the element stack body decreases. The ESL is therefore likely to be reduced.

In the third capacitor element, the first end is electrically connected to at least one of the first external electrode or the third external electrode. In the third capacitor element, either one of first end surface C and third end surface C may be exposed from the exterior body (and the other is not exposed from the exterior body) to electrically connect the first external electrode or the third external electrode to the first end, or both of first end surface C and third end surface C may be exposed from the exterior body to electrically connect the first external electrode and the third external electrode to the first end.

In the third capacitor element, third end surface C may be exposed from the exterior body and electrically connected to the third external electrode, with the first end surface C being not exposed from the exterior body. In this case, the third capacitor element also corresponds to the second capacitor element.

The electrical connection between the element stack body and the external electrodes may be performed by electrically connecting the end surfaces (first end surface to fourth end surface) of the first end and the second end of the capacitor element exposed from the exterior body of each capacitor element to the external electrodes (first to fourth external electrodes). The electrical connection between each end surface and the corresponding external electrode may be performed, for example, by using an external electrode formed along the first to fourth principal surfaces of the exterior body or by electrically connecting an intermediate electrode layer formed along the first to fourth principal surfaces to the external electrode. In this case, since there is no need to interpose another member for connecting the first end and the second end to the first to fourth external electrodes in the exterior body, the capacitance of the electrolytic capacitor is likely to increase.

In addition, in the current path from the portion of the anode body where the cathode part is not formed (anode lead-out part) to the first or third external electrode, the current path flowing parallel to the stacking surface of the element stack body is substantially equal to the length of the anode lead-out part. Thus, the ESL caused by the current path flowing parallel to the stacking surface of the element stack body can be further reduced by shortening this length.

In each of the capacitor elements, the anode body may have a recess recessed in the second direction (direction of the second end of the cathode part). A part of the cathode part may extend to protrude from the recess to form the second end. The recessing direction of the recess may be a normal direction of the second principal surface or the fourth principal surface. As a result, it becomes easy to expose the end surface (the second end surface and/or the fourth end surface) of the second end from the exterior body and electrically connect the end surface to the second external electrode or the fourth external electrode.

In the first capacitor, the end surface (second end surface A) of the cathode part exposed from the exterior body on the second principal surface may be closer to the first principal surface on which the first external electrode is provided than to the third principal surface. In this case, the separation distance between the first external electrode and the second external electrode is further shortened, and the ESL is further reduced.

In another exemplary embodiment, in the first capacitor element, second end surface A that is an end surface of the end of the cathode part at the second principal surface may be exposed from the exterior body to be electrically connected to the second external electrode, and fourth end surface A that is an end surface of the end of the cathode part on the fourth principal surface may be exposed from the exterior body to be electrically connected to the second external electrode. In this case, the ESL is remarkably reduced by providing second end surface A of the cathode part of the first capacitor at a position closer to the first principal surface than to the third principal surface.

In the above case, third end surface A that is an end surface of the end of the cathode part at the third principal surface may be exposed from the exterior body, and third end surface A may be electrically connected to a third external electrode, with the end of the anode body being not exposed from the third principal surface of the exterior body. That is, the third external electrode is a cathode electrode, and the first external electrode as an anode electrode and the third external electrode as a cathode electrode may face each other. Alternatively, neither the end of the anode body nor the end of the cathode part may be exposed from the third principal surface of the exterior body. In the latter case, it is not necessary to provide the third external electrode. However, when the third external electrode is not provided, fixation of the electrolytic capacitor to the external circuit board becomes unstable, and the first external electrode and/or the second external electrode of the electrolytic capacitor may be electrically disconnected from the electrode terminal provided on the external substrate due to impact or vibration during movement. Thus, the third external electrode is preferably disposed to cover at least the third principal surface side of the bottom surface of the electrolytic capacitor from the second external electrode to stably fix the electrolytic capacitor to the external circuit board and inhibit disconnection due to impact or vibration, even when neither the end of the anode part nor the end of the cathode part is exposed from the third principal surface of the exterior body.

The cathode part includes, for example, a solid electrolyte layer covering at least a part of the dielectric layer. The cathode part may further include a cathode foil that covers at least a part of the solid electrolyte layer. In this case, a part of the cathode foil covers the solid electrolyte layer, and a remaining part of the cathode foil that does not cover the solid electrolyte layer may constitute the end of the cathode part (cathode lead-out part). In this case, the end of the cathode foil may be the portion of the cathode foil extending to protrude from the recess of the anode body.

It is not necessary that all the cathode part have the cathode foil. For example, when the solid electrolyte layer and/or a conductive resin layer are formed to cover the end surface in addition to the principal surface of the anode body, so that the cathode parts formed on both surfaces of the anode body are electrically connected to each other, the effect of reducing the ESL according to the present disclosure can be obtained by exposing the end surface of an end of the cathode part from the exterior body at least on the second principal surface in at least one first capacitor element.

The cathode foil is, for example, a metal foil, and it may be a sintered foil, a vapor deposited foil, or a coated foil. The cathode foil may be a sintered foil, a vapor deposited foil, or a coated foil obtained by covering a surface of a metal foil (for example, Al foil or Cu foil) with a conductive film by vapor deposition or coating. The vapor deposition foil may be an Al foil with Ni that is vapor-deposited on the surface. Examples of the conductive film include Ti, TiC, TiO, and C (carbon) films. The conductive film may be a carbon coating film. Hereinafter, a method for producing an electrolytic capacitor using such a cathode foil will be described in detail.

In the electrolytic capacitor of the present exemplary embodiment, the first external electrode or the third external electrode may be provided along a surface parallel to the longitudinal direction of the exterior body or may be provided along a surface parallel to the lateral direction of the exterior body when the exterior body is viewed from the stacking direction of the element stack body. That is, in the exterior body, the separation distance between the first principal surface and the third principal surface may be shorter or longer than the separation distance between the second principal surface and the fourth principal surface. Usually, when an anode electrode is disposed on the first principal surface and a cathode electrode is disposed on the third principal surface, the distance between the anode electrode and the cathode electrode becomes short when the separation distance between the first principal surface and the third principal surface is shorter than the separation distance between the second principal surface and the fourth principal surface, and therefore the ESL is reduced. However, in the electrolytic capacitor of the present exemplary embodiment, since the first external electrode as an anode electrode is disposed on the first principal surface and the second external electrode as a cathode electrode is disposed on the second principal surface, the ESL can be reduced by disposing the first external electrode and the second external electrode close to each other even when the separation distance between the first principal surface and the third principal surface is longer than the separation distance between the second principal surface and the fourth principal surface.

Each of the first to fourth external electrodes may extend from the corresponding principal surface along the bottom surface of the electrolytic capacitor. By extending the external electrode on the bottom surface of the electrolytic capacitor, an anode terminal and/or a cathode terminal can be provided on the bottom surface of the electrolytic capacitor. In this case, the current flowing through the extension part of the first external electrode flows in the direction opposite to the current flowing through the end of the anode body exposed on the first principal surface, and the current flowing through the extension part of the third external electrode flows in the direction opposite to the current flowing through the end of the anode body or the cathode part exposed on the third principal surface. As a result, the magnetic field generated by the current flowing through each end is canceled by the magnetic field generated by the current flowing through the extension part of the first or third external electrode, and the ESL of the electrolytic capacitor can be further reduced.

Similarly, the current flowing through the extension part of the second external electrode flows in the direction opposite to the current flowing through the end of the cathode part exposed on the second principal surface, and the current flowing through the extension part of the fourth external electrode flows in the direction opposite to the current flowing through the end of the cathode part exposed on the fourth principal surface. As a result, the magnetic field generated by the current flowing through each end is canceled by the magnetic field generated by the current flowing through the extension part of the second or fourth external electrode, and the ESL of the electrolytic capacitor can be further reduced.

In addition, the separation distance between the anode terminal (first or third external electrode) and the cathode terminal (second or fourth external electrode) can be further shortened with the extension parts, which has an effect of improving the ESL. The synergy of these effects can significantly reduce the ESL.

At least one of the first to fourth external electrodes may include a plurality of electrode portions disposed apart from each other each along the corresponding principal surface. The anode terminal or the cathode terminal having a plurality of terminals causes the ESL to further decrease. When the third external electrode is provided and at least either one of the first external electrode and the third external electrode includes a plurality of electrode portions, the anode terminal includes three or more terminals. When the fourth external electrode is provided and at least either one of the second external electrode and the fourth external electrode includes a plurality of electrode portions, the cathode terminal includes three or more terminals.

Hereinafter, an electrolytic capacitor according to the exemplary embodiment and a method for producing the electrolytic capacitor will be described with reference to the drawings.

First Exemplary Embodiment

Figure 1B:
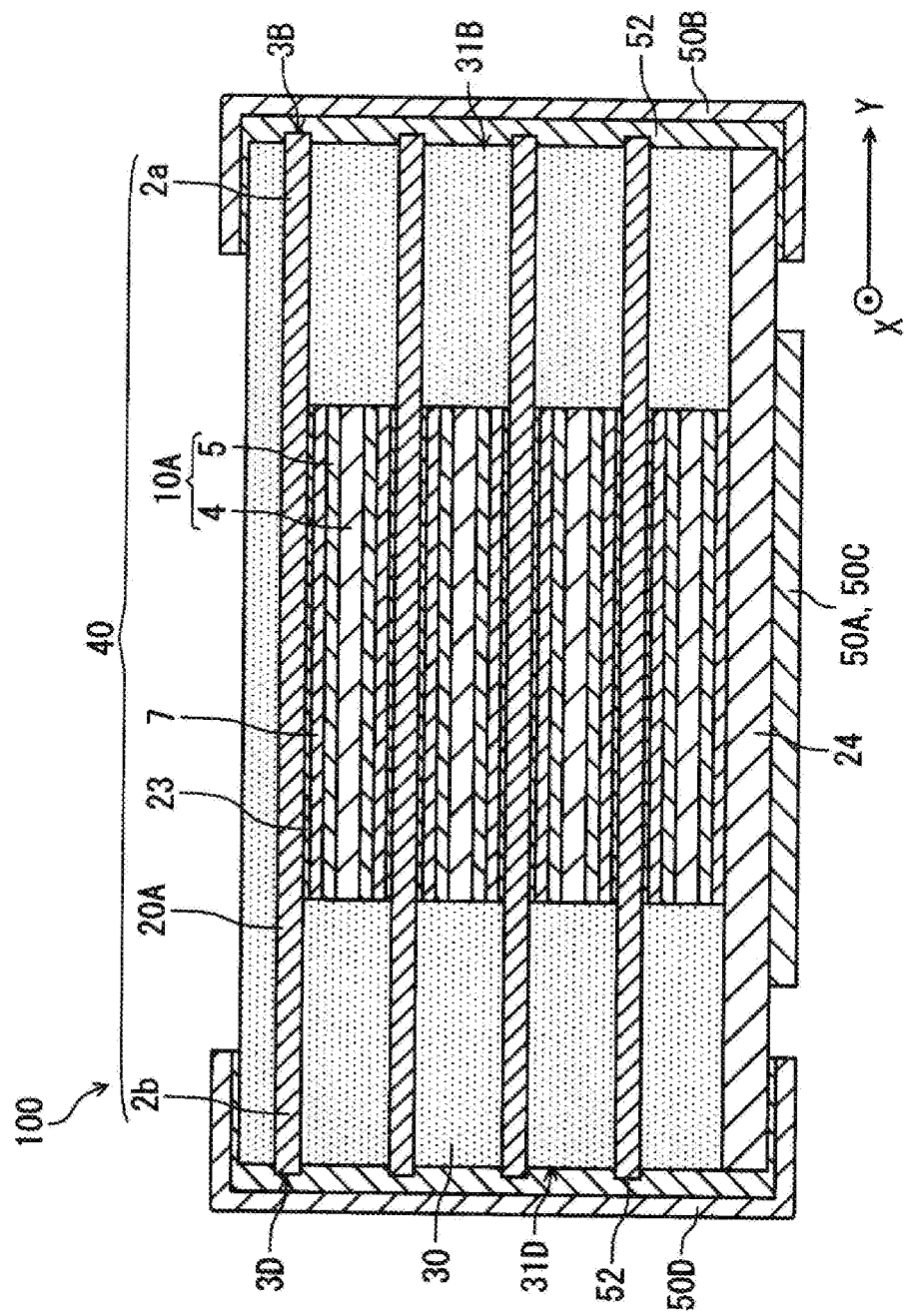
FIG. 1B is a sectional view schematically illustrating the structure of the electrolytic capacitor according to an exemplary embodiment of the present disclosure.

FIGS. 1A and 1B are sectional views schematically illustrating a structure of an electrolytic capacitor according to the present exemplary embodiment. FIG. 1A is a sectional view when viewed from a direction perpendicular to a stacking direction of capacitor elements and perpendicular to a first direction (X direction). FIG. 1B is a sectional view when viewed from a direction perpendicular to the stacking direction of capacitor elements and perpendicular to a second direction (Y direction) intersecting the first direction. However, the electrolytic capacitor according to the present disclosure is not limited thereto.

As illustrated in FIGS. 1A and 1B, electrolytic capacitor 100 includes anode foil 10A as an anode body, solid electrolyte layer 7, and cathode foil 20A. Anode foil 10A and cathode foil 20A are alternately stacked with solid electrolyte layer 7 interposed therebetween. One capacitor element 40 (first capacitor element) is constituted by solid electrolyte layer 7, which constitutes a cathode part, and anode foil 10A, whic is interposed between solid electrolyte layers 7. Electrolytic capacitor 100 includes an element stack body including a plurality of capacitor elements 40 in which a plurality of anode foils 10A and a plurality of solid electrolyte layers 7 are stacked with cathode foils 20A interposed therebetween. In the example of FIGS. 1A and 1B, four anode foils 10A and four cathode foils 20A are provided, and one capacitor element is formed by one surface of the anode foil and one surface of the cathode part (cathode foil) facing each other, so that seven capacitor elements are formed. The element stack body is supported by substrate 24. The substrate is, for example, an insulating substrate, and may be a metal substrate or a printed substrate provided with a wiring pattern as long as external electrodes 50A, 50C and the external electrodes 50B, 50D are electrically separated from each other. The cathode foil may be disposed between the solid electrolyte layer located on the lowermost surface of the element stack body and substrate 24.

Anode foil 10A has porous part 5 on a surface thereof, and a dielectric layer (not illustrated) is formed on at least a part of the surface of porous part 5. Solid electrolyte layer 7 covers at least a part of the dielectric layer.

As illustrated in FIG. 1A, anode foil 10A has a region covered with solid electrolyte layer 7 and a region not covered with solid electrolyte layer 7. Anode foil 10A has a pair of first ends 1a and 1b opposite to each other in the first direction (X direction), and first ends 1a and 1b are not covered with the solid electrolyte layer but are covered with insulating film 8 instead. The region (first ends 1a and 1b) of anode foil 10A not covered with the solid electrolyte layer is also referred to as an anode lead-out part. The region of anode foil 10A covered with solid electrolyte layer 7 is also referred to as a cathode formation part.

More specifically, anode foil 10A has core 4 and porous part (porous body) 5 formed on a surface of core 4 by roughening (etching or the like) or the like in the cathode formation part. On the other hand, the anode lead-out part may have porous part 5 on a surface but does not have to have porous part 5. The dielectric layer is formed along the surface of porous part 5. At least a part of the dielectric layer covers the inner wall surface of a hole of the porous part 5 and is formed along the inner wall surface. The surface of the dielectric layer has an irregularity shape corresponding to the shape of the surface of the porous part 5, and solid electrolyte layer 7 may be formed to fill such irregularities of the dielectric layer.

Adhesive layer 23 is interposed between cathode foil 20A and solid electrolyte layer 7. Cathode foil 20A covers at least a part of solid electrolyte layer 7 with adhesive layer 23 interposed therebetween. Cathode foil 20A, solid electrolyte layer 7, and adhesive layer 23 constitute the cathode part.

As illustrated in FIG. 1B, cathode foil 20A has a region facing solid electrolyte layer 7 and a region not facing solid electrolyte layer 7. Cathode foil 20A has a pair of second ends 2a and 2b opposite to each other in the second direction. Solid electrolyte layer 7 does not cover second end 2a or 2b. A surface of cathode foil 20A is exposed in second ends 2a and 2b.

Electrolytic capacitor 100 includes the above-described element stack body including the plurality of capacitor elements 40, exterior body 30 that seals the element stack body, first external electrode 50A, second external electrode 50B, third external electrode 50C, and fourth external electrode 50D. First external electrode 50A and third external electrode 50C are anodes of electrolytic capacitor 100, and second external electrode 50B and fourth external electrode 50D are cathodes of electrolytic capacitor 100.

Exterior body 30 has a substantially rectangular parallelepiped outer shape, and electrolytic capacitor 100 also has a substantially rectangular parallelepiped outer shape.

Exterior body 30 includes first principal surface 31A, second principal surface 31B intersecting with first principal surface 31A, third principal surface 31C opposite to first principal surface 31A, and fourth principal surface 31D opposite to second principal surface 31B.

As illustrated in FIG. 1A, end surface 3A (first end surface) of first end 1a of anode foil 10A is exposed from exterior body 30 at first principal surface 31A, and is electrically connected to first external electrode 50A. End surface 3C (third end surface) of first end 1b of anode foil 10A is exposed from exterior body 30 at third principal surface 31C, and is electrically connected to third external electrode 50C.

On the other hand, as illustrated in FIG. 1B, end surface 3B (second end surface) of second end 2a of cathode foil 20A is exposed from exterior body 30 at second principal surface 31B, and is electrically connected to second external electrode 50B. End surface 3D (fourth end surface) of second end 2b of cathode foil 20A is exposed from exterior body 30 at fourth principal surface 31D, and is electrically connected to fourth external electrode 50D.

That is, in electrolytic capacitor 100, a plurality of first ends 1a, a plurality of first ends 1b, a plurality of second ends 2a, and a plurality of second ends 2b exposed from exterior body 30 are electrically connected to respective external electrodes 50A to 50D extending along corresponding principal surfaces 31A to 31D, respectively. In this case, it is not necessary to bundle the plurality of first ends to form an anode of the electrolytic capacitor, and it is not necessary to secure a length for bundling the plurality of first ends. The proportion of the first end to the anode body can be therefore reduced to increase the capacitance as compared with the case where the plurality of first ends are bundled. Further, the contribution of the first end to the ESL is reduced. Further, since the anode (first external electrode 50A and/or third external electrode 50C) and the cathode (second external electrode 50B and/or fourth external electrode 50D) of the electrolytic capacitor are provided on principal surfaces intersecting with each other, the separation distance between the external electrode as the positive electrode and the external electrode as the negative electrode can be shortened, and the ESL can be reduced.

In electrolytic capacitor 100, each of end surfaces of the plurality of first ends 1a, 1b and end surfaces of the plurality of second ends 2a, 2b exposed from exterior body 30 is covered with contact layer 51. Intermediate electrode layer 52 covers contact layer 51 and each of the principal surfaces 31A to 31D of exterior body 30. First to fourth external electrodes 50A to 50D cover the corresponding intermediate electrode layers 52, respectively. This enables the end surfaces of first ends 1a, 1b and second ends 2a, 2b to be electrically connected to the corresponding external electrodes 50A to 50D, respectively.

Each of external electrodes 50A to 50D is bent along the bottom surface of exterior body 30 and exposed at the bottom surface of electrolytic capacitor 100. For example, a part of third external electrode 50C is bent along the bottom surface of exterior body 30 to face the bent portion of first external electrode 50A, and is exposed at the bottom surface of electrolytic capacitor 100. The exposed portions of first external electrode 50A and third external electrode 50C at the bottom surface constitute anode terminals of the electrolytic capacitor. On the other hand, the exposed portions of second external electrode 50B and fourth external electrode 50D at the bottom surface constitute cathode terminals of the electrolytic capacitor. That is, in the present exemplary embodiment, electrolytic capacitor 100 has two anode terminals separated from each other and two cathode terminals separated from each other. The anode terminals and the cathode terminals may be provided along sides intersecting with each other at the bottom surface of electrolytic capacitor 100. In this case, the separation distance between the anode terminals and the cathode terminals can be shortened, and the ESL can be reduced as compared with the conventional configuration in which an anode terminal and a cathode terminal are provided along the sides facing each other at the bottom surface of electrolytic capacitor 100.

Figure 1C:
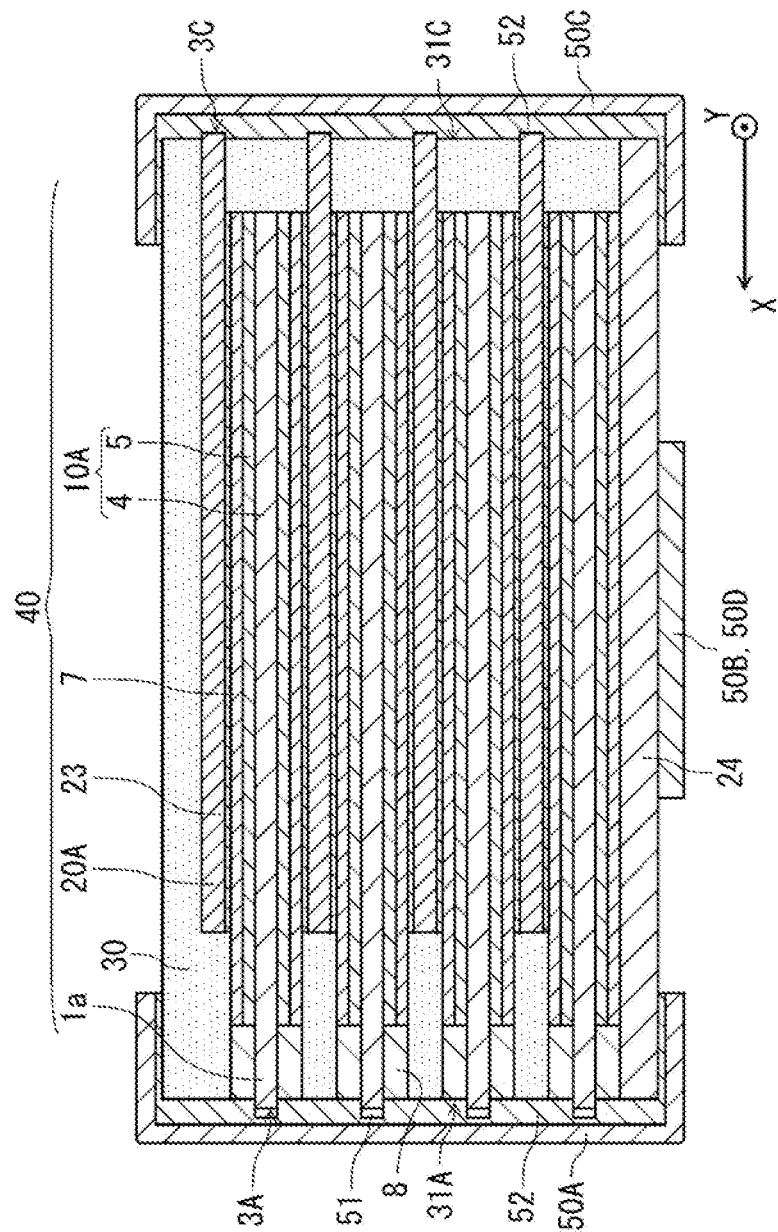
FIG. 1C is a sectional view schematically illustrating another example of the structure of the electrolytic capacitor according to an exemplary embodiment of the present disclosure.

In electrolytic capacitor 100 illustrated in FIG. 1A, end 1b of anode foil 10A is exposed at third principal surface 31C and is electrically connected to third external electrode 50C at end surface 3C. Meanwhile, an end of cathode foil 20A may be exposed at third principal surface 31C and may be electrically connected to third external electrode 50C at end surface 3C. FIG. 1C is a sectional view illustrating the electrolytic capacitor in a case where third external electrode 50C is electrically connected to the cathode parts of the electrolytic capacitor in the structure of the electrolytic capacitor illustrated in FIG. 1A. In this case, the electrolytic capacitor may have one anode terminal and three cathode terminals.

(Method for Producing Electrolytic Capacitor)

A method for producing an electrolytic capacitor according to the present exemplary embodiment is a method for producing an electrolytic capacitor, the electrolytic capacitor including an element stack body including a plurality of capacitor elements each including an anode body having a porous part on a surface of the anode body, a dielectric layer formed on at least a part of a surface of the porous part, and a cathode part covering at least a part of the dielectric layer. The method includes a step of obtaining an element assembly in which a plurality of element stack bodies are arrayed on a plane perpendicular to a stacking direction, each of the plurality of element stack bodies being the element stack body, a step of dividing the element assembly into the plurality of element stack bodies, and a step of electrically connecting an end of the anode body of the element stack body to a first external electrode and electrically connecting an end of the cathode part of the element stack body to a second external electrode.

The step of obtaining the element assembly includes, for example, the following steps (i) to (vi):
(i) preparing an anode foil including a porous part formed on a surface of the anode foil;
(ii) forming a dielectric layer on a surface of the anode foil;
(iii) forming a first opening in a region of the anode foil corresponding to the second end;
(iv) forming a solid electrolyte layer in a first region of the anode foil;
(v) preparing a cathode foil processed into a shape having a second region partially facing the first region; and
(vi) alternately stacking the anode foil and the cathode foil.

Step (v) may be performed in parallel with steps (i) to (iv) independently of steps (i) to (iv). Step (iii) may be performed after step (i). Step (iv) may be performed after step (ii). Step (iii) may be performed before step (iv) or after step (iv).

Each of the first region of the anode foil and the second region of the cathode foil has an arrangement pattern that may include a periodic pattern in which a unit pattern is periodically repeated in at least one of a first direction or a second direction intersecting the first direction. The unit pattern of the first region may include region $A_1$ located at a center in the first direction and region $A_2$ extending in the first direction from region $A_1$. The unit pattern of the second region may include region $A_3$ corresponding to region $A_1$ of the anode foil and region $A_4$ extending in the second direction from region $A_3$.

Note that "extending in the first direction" means extending substantially parallel to the first direction, and includes both a case of extending in one direction parallel to the first direction with a certain region as a starting point and a case of extending in the other direction parallel to the first direction (direction opposite to the one direction parallel to the first direction). The same applies to "extending in the second direction".

In the present exemplary embodiment, by stacking an anode foil and a cathode foil patterned in a predetermined shape in advance, an assembly in which a plurality of capacitor element stack bodies are periodically arrayed on a plane perpendicular to the stacking direction is obtained. Thereafter, the assembly is cut along a predetermined cut surface parallel to the stacking direction to be divided into a plurality of element stack bodies. This improves productivity in producing the electrolytic capacitor.

Figure 2A:
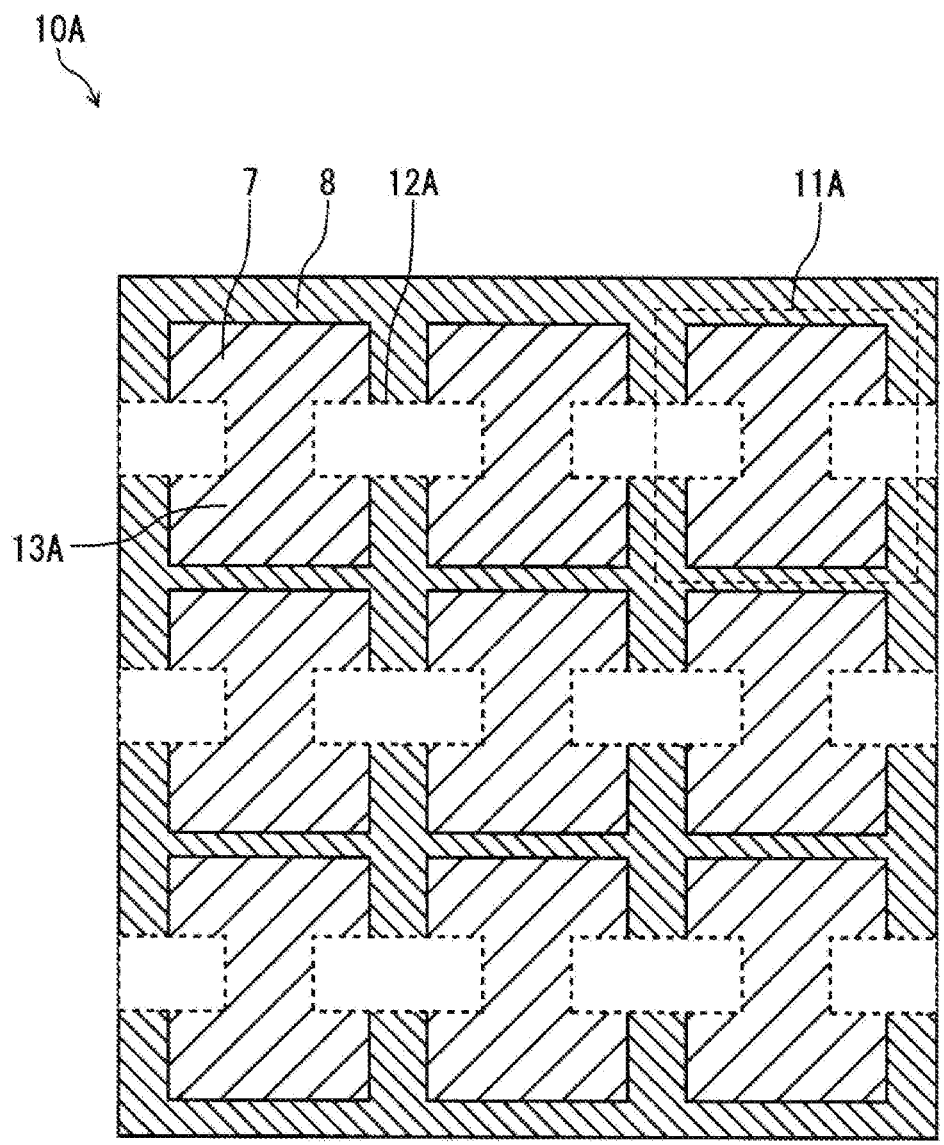
FIG. 2A is a layout diagram schematically illustrating a pattern of an anode foil used for producing the electrolytic capacitor according to an exemplary embodiment of the present disclosure.
Figure 2B:
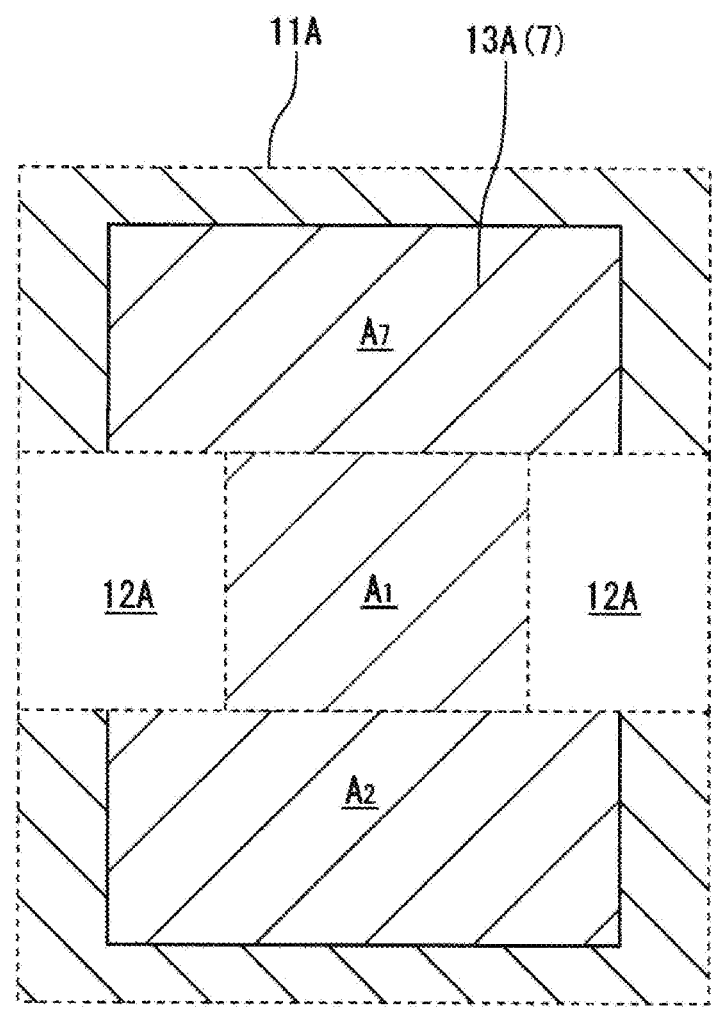
FIG. 2B is an enlarged view of a part of FIG. 2A.

FIG. 2A is a view illustrating an example of a pattern of an anode foil for forming an element assembly in the present exemplary embodiment. In FIG. 2A, anode foil 10A has a pattern in which anode pattern 11A is periodically repeated in the first direction (X direction) and the second direction (Y direction). In FIG. 2A, as anode pattern 11A, a pattern of first opening 12A formed in step (iii), and a pattern of solid electrolyte layer 7 and insulating film (resist) 8 formed in step (iv) are illustrated. FIG. 2B is an enlarged view of anode pattern 11A in FIG. 2A. In FIGS. 2A and 2B, a region outside both ends in the first direction (X direction) of a formation region (first region) of solid electrolyte layer 7 in anode pattern 11A constitutes a pair of first ends opposite to each other in the first direction.

Figure 3A:
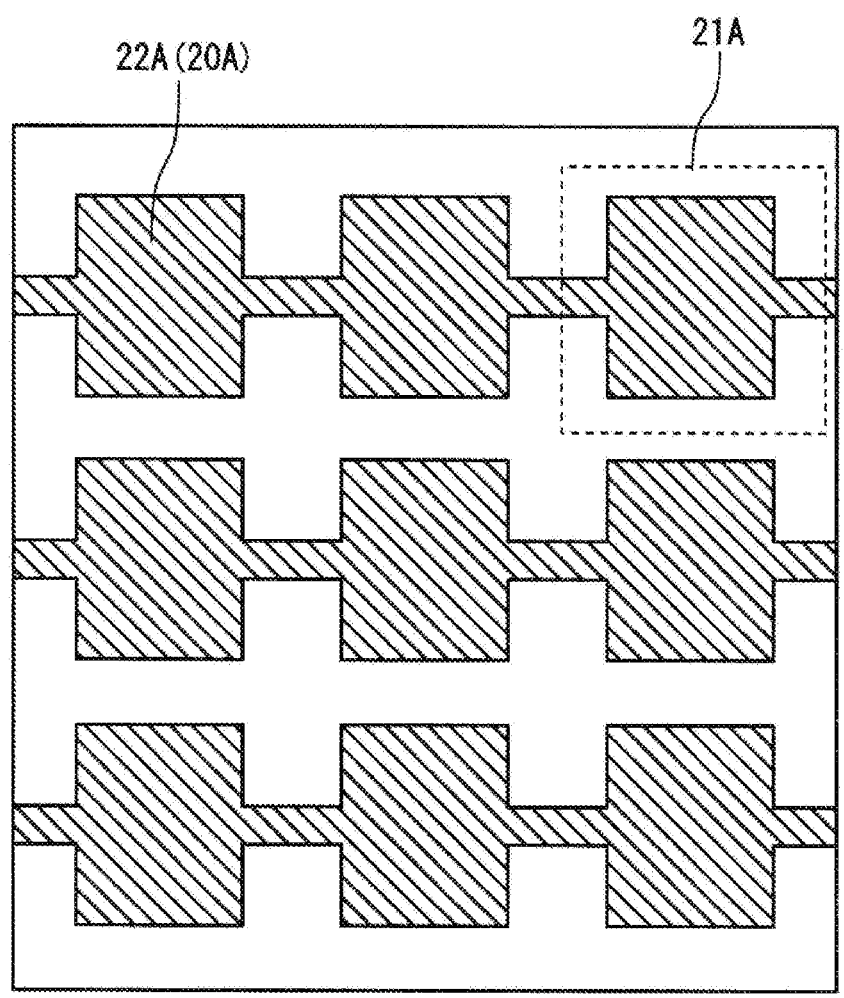
FIG. 3A is a layout diagram schematically illustrating an arrangement pattern of a cathode foil used for producing the electrolytic capacitor according to an exemplary embodiment of the present disclosure.
Figure 3B:
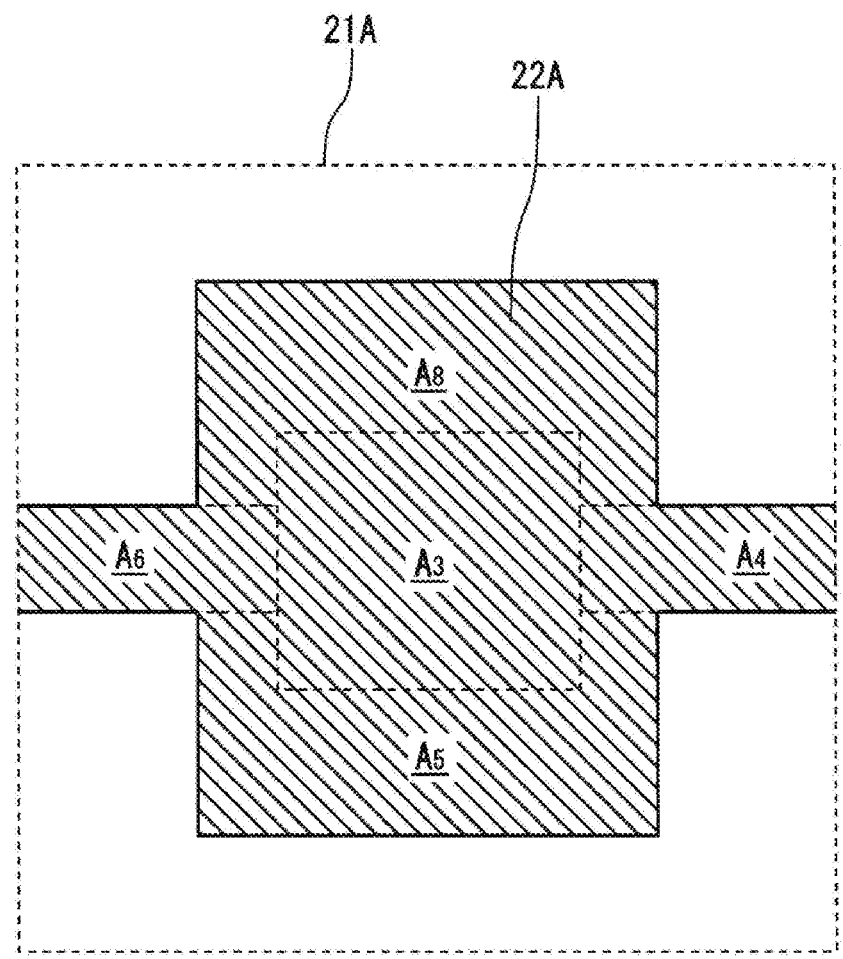
FIG. 3B is an enlarged view of a part of FIG. 3A.

FIG. 3A is a diagram illustrating an example of a shape and an arrangement pattern of a cathode foil for forming an element assembly in the present exemplary embodiment. In FIG. 3A, cathode foil 20A is overlapped with the anode foil in an arrangement pattern in which cathode pattern 21A is periodically repeated in the first direction (X direction) and the second direction (Y direction). FIG. 3B is an enlarged view of cathode pattern 21A in FIG. 3A. In FIGS. 3A and 3B, cathode foil 20A is present in region 22A (second region). A region other than the region 22A is a cathode non-formation region. Both ends in the second direction (Y direction) of the cathode formation region (second region) in cathode pattern 21A constitute a pair of second ends opposite to each other in the second direction.

(Step of Obtaining Element Assembly)

Step (i)

First, an anode foil having a porous part formed on its surface is prepared. The anode foil may include a valve metal, an alloy including a valve metal, a compound including a valve metal (such as an intermetallic compound), and the like. These materials may be used singly or in combination of two or more kinds thereof. As the valve metal, aluminum, tantalum, niobium, titanium, or the like may be used. The anode foil may be a foil of a valve metal, an alloy containing a valve metal, or a compound containing a valve metal, or may be a porous sintered body (sintered foil) of a valve metal, an alloy containing a valve metal, or a compound containing a valve metal.

When a metal foil is used for the anode foil, a porous part is usually formed to increase the surface area. The porous part may be formed on the entire surface of the anode foil, or may be formed in a predetermined region (for example, the formation region of the solid electrolyte layer in step (iv)) of a part of the surface of the anode foil. The porous part may be formed by roughening the entire surface of the anode foil by etching or the like. A roughening treatment such as an etching treatment may be performed after disposing a masking member on a predetermined region of the surface of the anode foil. The etching treatment is performed using a known technique, such as electrolytic etching. The masking member is not particularly limited, but an insulator such as resin is preferable. The masking member may be a conductive material, which needs to be removed before the formation of the solid electrolyte layer.

The porous part does not have to be formed in the region of the anode foil where the first ends are to be formed. When the porous part is formed at the first ends, adhesion between the porous part and the exterior body is not sufficient, and air (specifically, oxygen and moisture) enters the inside of the electrolytic capacitor through a contact portion between the porous part and the exterior body in some cases. By forming no porous part at the first ends, adhesion between the anode foil and the exterior body can be maintained high, air from entering the electrolytic capacitor through the porous part from the first ends exposed from the exterior body can be inhibited, and thus lowering of the reliability in the electrolytic capacitor due to the entering of air can be suppressed.

Step (ii)

Next, a dielectric layer is formed on a surface of the anode foil. The dielectric layer is formed, for example, by anodizing a predetermined region including the region where the porous part is formed on the surface of the anode foil by an anodizing treatment or the like. The dielectric layer contains an oxide of valve metal. For example, when aluminum is used as the valve metal, the dielectric layer contains aluminum oxide. The dielectric layer is formed at least along the surface of the porous part (including the inner wall surface of the pore of the porous part). The method for forming the dielectric layer is not limited to this, and an insulating layer functioning as a dielectric material may be formed on the surface of the porous part.

Step (iii)

Next, first opening 12A is formed in a region of the anode foil, which corresponds to the second ends of the cathode part. For example, as illustrated in FIG. 2A, first openings 12A are periodically disposed to intermittently extend in the second direction (Y direction). As illustrated in FIG. 2B, first openings 12A may be disposed to sandwich center region $A_1$ in anode pattern 11A. Region $A_1$ is also located at the center in the first direction (X direction).

Step (iv)

Next, solid electrolyte layer 7 is formed in the first region of the anode foil. At this time, insulating film 8 may be formed in a region excluding the first region. In the present exemplary embodiment, solid electrolyte layer 7 and insulating film 8 are formed on both surfaces of the anode foil. Insulating film 8 is a film (resist) for preventing the solid electrolyte layer from being formed in a predetermined region (region excluding the first region) of the anode foil. Insulating film (resist) 8 may be formed by supplying a resin to a predetermined region of the anode foil, for example, by screen printing, inkjet, transfer, tape bonding, or the like. Examples of the resin material include insulating resins such as epoxy resin, phenol resin, silicone resin, melamine resin, urea resin, alkyd resin, polyurethane, polyamide, polyimide, polyamide-imide, and unsaturated polyester.

The resin material may contain the same resin as the resin used in the exterior body described later. Meanwhile, it is preferable that the resin used for the insulating film does not contain a filler or contains a filler having a particle size smaller than that of the filler contained in the resin used for the exterior body from the viewpoint of easily impregnating the deep portion of the recess on the surface of the porous part of the anode foil with the liquid resin material and easily forming the insulating film with a small thickness so that a plurality of capacitor elements can be stacked.

Solid electrolyte layer 7 contains, for example, a conductive polymer. As the conductive polymer, for example, polypyrrole, polythiophene, polyaniline, derivatives thereof, and the like may be used. The solid electrolyte layer may be formed, for example, by applying a solution in which the conductive polymer is dissolved or a dispersion liquid in which the conductive polymer is dispersed to the dielectric layer. Solid electrolyte layer 7 may contain a manganese compound.

For example, after the insulating film (resist) 8 is formed, solid electrolyte layer 7 is formed in a region (first region 13A) where the insulating film (resist) 8 is not formed. For example, as illustrated in FIG. 2B, first region 13A includes region $A_1$ located at the center in pattern 11A and region $A_2$ extending in the first direction (X direction) from region $A_1$. The first region may also include region $A_7$ extending in the first direction from region $A_1$ on the side opposite to region $A_2$.

Since region $A_1$ is a region sandwiched by first openings 12A, the extension width of region $A_1$ in the second direction is limited by first openings 12A. On the other hand, since region $A_2$ and region $A_7$ are not sandwiched by first openings 12A in the second direction, the extension widths of region $A_2$ and region $A_7$ in the second direction can be longer than the extension width of region $A_1$ in the second direction. This enables the area of the anode foil facing the cathode foil to be increased and high capacitance to be obtained. In this case, first region 13A, which is a formation region of solid electrolyte layer 7, may have a recess recessed in the second direction. The recess has a shape along an edge of first opening 12A.

Due to the formation of first opening 12A, the end surface of the anode foil is exposed at the edge of first opening 12A, and the core portion of the anode foil is exposed at the end surface. When solid electrolyte layer 7 is formed after first opening 12A is formed, an insulating layer may be formed on the end surface of the anode foil exposed due to first opening 12A, so that the exposed core portion is not covered with the solid electrolyte layer. The insulating film may be formed, for example, by subjecting the end surface to an anodizing treatment and forming an oxide film on the surface of the exposed core portion. Meanwhile, the step of forming the insulating layer is not necessarily required when first region 13A is sufficiently separated from the edge of first opening 12A via insulating film 8, or when first opening 12A is formed after solid electrolyte layer 7 is formed.

In the example of FIGS. 2A and 2B, a part of the edge of first opening 12A is in contact with first region 13A. In this case, by forming the insulating layer on the exposed end surface and then forming the solid electrolyte layer, the solid electrolyte layer can adhere to cover the insulating layer. As a result, the solid electrolyte layer formed on both surfaces of the anode foil can be electrically connected, and the plurality of capacitor elements in the element stack body can be electrically connected. This can reduce the ESR.

Step (v)

Cathode foil 20A is prepared in parallel with steps (i) to (iv). Cathode foil 20A is processed into a shape having second region 22A partially facing first region 13A. The cathode foil is a conductive sheet, and is, for example, a metal foil such as an aluminum foil. The metal foil may be a sintered foil, a vapor deposited foil, or a coated foil whose surface is coated with a conductive film. Examples of the conductive film include Ti, TiC, TiO, and C (carbon) films. The conductive film may be a carbon coating film. Cathode foil 20A is obtained, for example, by cutting a large metal foil into a predetermined shape having second region 22A.

As illustrated in FIG. 3B, second region 22A includes region $A_3$ corresponding to region $A_1$ of anode foil 10A, and may include region $A_4$ extending in the second direction (Y direction) from region $A_3$. Second region 22A may also include region $A_5$ extending from region $A_3$ in the first direction (X direction) and region $A_8$ extending in the first direction (X direction) from region $A_3$ on the side opposite to region $A_5$. In this case, at least a part of region $A_5$ overlaps a region corresponding to region $A_2$ of the anode foil. At least a part of region $A_8$ overlaps a region corresponding to region $A_7$ of the anode foil.

The region corresponding to the region of the anode foil means a region of the cathode foil that faces the region of the anode foil when cathode foil 20A is stacked on anode foil 10A such that the contour of anode pattern 11A matches the contour of cathode pattern 21A.

Region $A_4$ has a portion protruding in the second direction with respect to region $A_5$ and region $A_8$. Second region 22A may also include region $A_6$ extending from region $A_3$ in the direction opposite to the direction in which region $A_4$ extends. In this case, region $A_6$ may have a part protruding with respect to region $A_5$ and region $A_8$ in the direction opposite to the protruding direction of region $A_4$. In the example of FIG. 3A, in the adjacent cathode patterns, the protrusion of one region $A_4$ and the protrusion of the other region $A_6$ are connected, and a belt-like second region 22A extending in the second direction is formed.

Step (vi)

Subsequently, the anode foil and the cathode foil are alternately stacked. At this time, anode foil 10A and cathode foil 20A are alternately placed so that the contour of anode pattern 11A matches the contour of cathode pattern 21A, whereby an element assembly is obtained.

Figure 4:
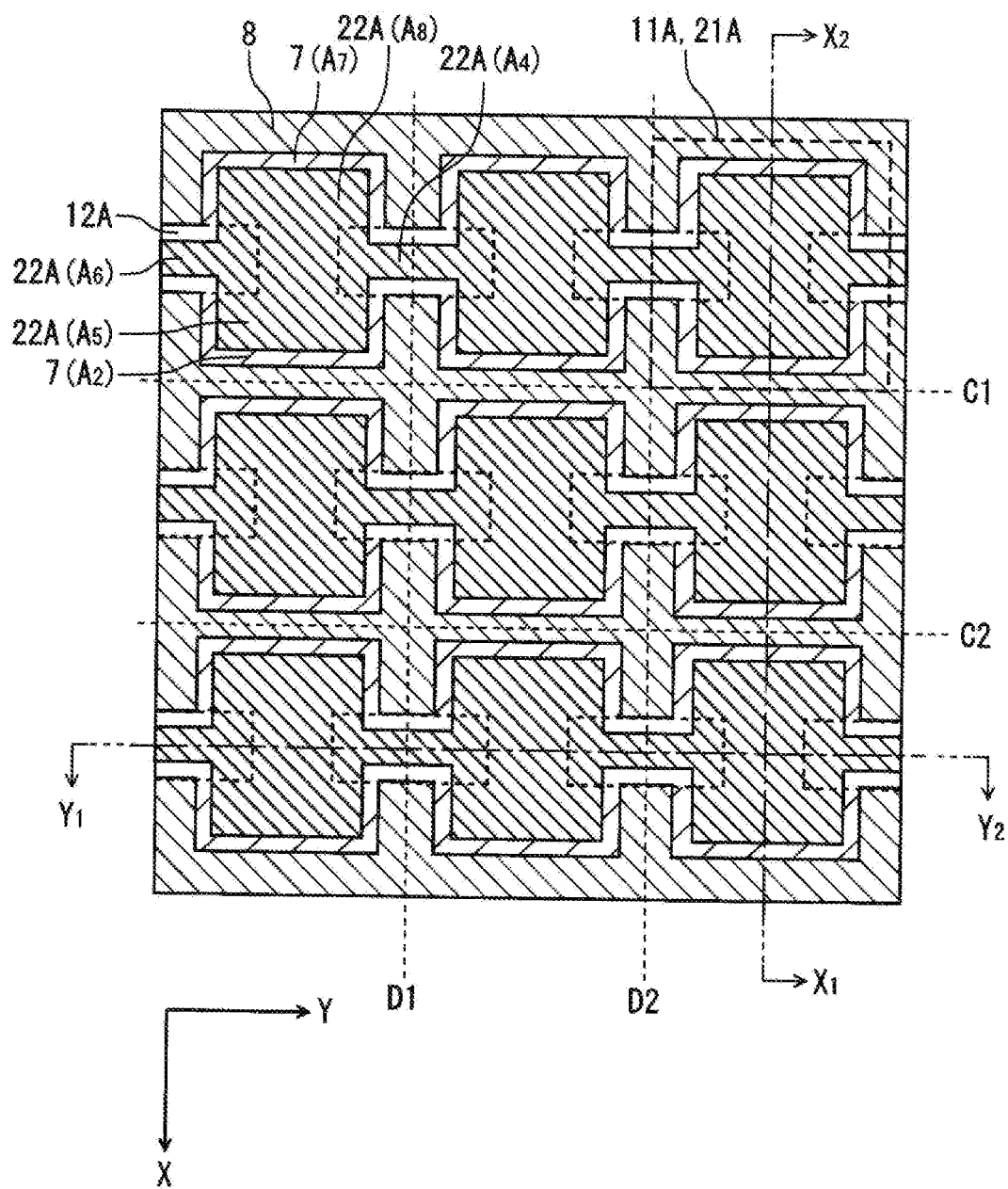
FIG. 4 is a layout diagram illustrating a state in which the anode foil and the cathode foil are stacked.

FIG. 4 is a layout diagram in which cathode foil 20A is stacked on anode foil 10A. As illustrated in FIG. 4, the extension distance of region $A_2$ of the anode foil from region $A_1$ in the first direction (X direction) is longer than the extension distance of region $A_5$ of the cathode foil from region $A_3$ in the first direction. The extension distance of region $A_7$ of the anode foil from region $A_1$ in the direction opposite to the first direction (X direction) is longer than the extension distance of region $A_8$ of the cathode foil from region $A_3$ in the direction opposite to the first direction. With this configuration, by cutting the element assembly along a straight line parallel to the second direction (Y direction) in such a manner as to cross the region (that is, the region where insulating film 8 is formed) outside first region 13A, only the end surface of the anode foil is exposed, with the end surface of the cathode foil not being exposed. A portion of anode foil 10A located outside region $A_2$ (far from region $A_1$) and a portion of anode foil 10A located outside region $A_7$ (far from region $A_1$) constitute the pair of first ends. The exposed end surface of the anode foil constitutes the first end surface or the third end surface.

In a state where anode foil 10A and cathode foil 20A are overlapped with each other, the protrusions of region $A_4$ and region $A_6$ extend in the second direction (Y direction) above and below first openings 12A. That is, anode foil 10A is not present above or below the protrusion. With this configuration, by cutting the element assembly along a straight line parallel to the first direction (X direction) in such a manner as to cross the protrusion, only the end surface of the cathode foil is exposed, with the end surface of the anode foil not being exposed. The ends of region $A_4$ and region $A_6$ on the protruding direction side constitute a pair of second ends. The exposed end surface of the cathode foil constitutes the second end surface or the fourth end surface.

Conductive adhesive layer 23 such as carbon paste or silver paste may be interposed between anode foil 10A and cathode foil 20A.

In step (iv), when solid electrolyte layers 7 formed on both surfaces of anode foil 10A are electrically connected to each other through solid electrolyte layer 7 formed on an end surface of anode foil 10A and/or electrically conductive adhesive layer 23, stacking of at least one cathode foil 20A may be omitted when anode foil 10A and cathode foil 20A are alternately stacked to obtain an element assembly.

(Step of Dividing Element Assembly)

Subsequently, the element assembly is cut along a plane perpendicular to the stacking direction to obtain a divided element stack body. The step of dividing the element assembly includes, for example, the following steps (vii) to (viii):
(vii) filling, with an exterior body, the first opening of the anode foil and a region other than the second region of the cathode foil of the element assembly;
(viii) exposing an end surface of the anode foil on the first principal surface of the exterior body by cutting the element assembly along a cutting line that does not cross the first region and is parallel to the second direction; and
(ix) exposing an end surface of the cathode foil on the second principal surface of the exterior body by cutting the element assembly along a cutting line that crosses region $A_4$ and is parallel to the first direction.

Step (vii)

First, the element assembly is placed on a substrate. Then, first opening 12A of anode foil and the region other than second region 22A of cathode foil of the element assembly is filled with exterior body 30. Exterior body 30 preferably contains, for example, a cured product of a curable resin composition, and may contain a thermoplastic resin or a composition containing a thermoplastic resin.

Exterior body 30 may be formed by using a molding technique such as injection molding. The exterior body may be formed, for example, by using a predetermined mold and filling a predetermined portion with a curable resin composition or a thermoplastic resin (composition) to cover the element assembly.

The curable resin composition may contain a filler, a curing agent, a polymerization initiator, a catalyst, and/or the like, in addition to the curable resin. Examples of the curable resin include epoxy resin, phenol resin, urea resin, polyimide, polyamide-imide, polyurethane, diallyl phthalate, and unsaturated polyester. Examples of the thermoplastic resin include polyphenylene sulfide (PPS) and polybutylene terephthalate (PBT). A thermoplastic resin composition containing a thermoplastic resin and a filler may be used.

As the filler, for example, insulating particles and/or fibers are preferable. Examples of an insulating material that constitutes the filler include insulating compounds (oxides, and the like) such as silica and alumina, glass, and mineral materials (talc, mica, clay, and the like). The exterior body may contain one type of these fillers, or may contain two or more types of these fillers in combination.

The resin used in exterior body 30 may contain the same resin as the resin used in insulating film 8 (resist) described above. In this case, the adhesion between the insulating film and the exterior body improves, and air is further inhibited from entering the electrolytic capacitor. Examples of the same resin contained in the insulating film and the exterior body include an epoxy resin. On the other hand, the filler that may be contained in the exterior body may be different from the filler that may be contained in the insulating film.

Step (viii)

Next, the element assembly in which gaps are filled with the exterior body is cut along a cutting line which does not cross first region 13A and is parallel to the second direction to expose the end surface of the anode foil on the first principal surface of the exterior body. The cutting is performed, for example, by dicing. For example, by cutting the element assembly along lines C1 and C2 illustrated in FIG. 4, the element assembly is separated in the first direction (X direction). In FIG. 4, lines C1 and C2 may be straight lines parallel to the second direction (Y direction) constituting the contour lines of anode pattern 11A and cathode pattern 21A.

At this time, in the separated element assembly pieces, end surfaces of the anode foil are exposed on both surfaces parallel to the second direction. One of both surfaces where the end surface of the anode foil is exposed is a first principal surface, and the other is a third principal surface. The end surface of the anode foil exposed to the first principal surface is the first end surface. The end surface of the anode foil exposed to the third principal surface is the third end surface.

Step (ix)

Further, the element assembly in which the gaps are filled with the exterior body is cut along a cutting line that crosses region $A_4$ and is parallel to the first direction to expose the end surface of the cathode foil on the second principal surface of the exterior body. The cutting is performed, for example, by dicing. For example, by cutting the element assembly along lines D1 and D2 illustrated in FIG. 4, the element assembly is separated in the second direction (Y direction). In FIG. 4, lines D1 and D2 may be straight lines parallel to the first direction (X direction) constituting the contour lines of anode pattern 11A and cathode pattern 21A.

At this time, in the separated element assembly pieces, end surfaces of the cathode foil are exposed on both surfaces parallel to the first direction. One of both surfaces where the end surface of the cathode foil is exposed is a second principal surface, and the other is a fourth principal surface. The end surface of the cathode foil exposed to the second principal surface is the second end surface. The end surface of the cathode foil exposed to the fourth principal surface is the fourth end surface.

By the steps (viii) and (ix), the element assembly is separated, and the element assembly is divided into a plurality of element stack bodies.

(Connection Step of External Electrode)

Next, the exposed end surfaces of the anode foil and the cathode foil are electrically connected to the external electrodes.

In this step, for example, first external electrode 50A is formed to cover a predetermined region of first principal surface 31A of the exterior body, and first external electrode 50A is electrically connected to first end surface 3A to cover first end surface 3A of the anode foil with first external electrode 50A. Similarly, second external electrode 50B is formed to cover a predetermined region of second principal surface 31B of the exterior body, and second external electrode 50B is electrically connected to second end surface 3B to cover second end surface 3B of the cathode foil with second external electrode 50B.

When the anode foil has third end surface 3C, third external electrode 50C may be electrically connected to third end surface 3C. Third external electrode 50C is formed to cover a predetermined region of third principal surface 31C of the exterior body. By forming third external electrode 50C to cover third end surface 3C of the anode foil, third external electrode 50C is electrically connected to third end surface 3C.

Similarly, when the cathode foil has fourth end surface 3D, fourth external electrode 50D may be electrically connected to fourth end surface 3D. Fourth external electrode 50D is formed to cover a predetermined region of fourth principal surface 31D of the exterior body. By forming fourth external electrode 50D to cover fourth end surface 3D of the cathode foil, fourth external electrode 50D is electrically connected to fourth end surface 3D.

The electrical connection between each of the first end surface to the fourth end surface and the corresponding external electrode may be performed for example by joining, or by electrolytic plating, electroless plating, a physical vapor deposition method, a chemical vapor deposition method, a cold spraying method, and/or a thermal spraying method may be used. Among them, electroless plating is preferable.

The first to fourth external electrodes are preferably metal layers. The metal layer may contain, for example, at least one selected from the group consisting of nickel (Ni), copper (Cu), zinc (Zn), tin (Sn), silver (Ag), and gold (Au).

The first to fourth external electrodes may have, for example, a stacked structure of a Ni layer and a tin layer. At least the outer surface of each of the first to fourth external electrodes is a metal having excellent wettability with solder. Examples of such a metal include Sn, Au, Ag, and Pd.

Prior to the formation of first to fourth external electrodes 50A to 50D, a step of forming contact layer 51 on the corresponding end surface of the external electrode and/or a step of forming intermediate electrode layer 52 covering a predetermined region of the corresponding principal surface of the exterior body may be performed. When intermediate electrode layer 52 is formed, each of the first to fourth external electrodes may be formed to cover the corresponding intermediate electrode layer.

When the intermediate electrode layer is formed, the first to fourth external electrodes may be formed by bonding a Cu cap on which a Sn film is formed in advance to the intermediate electrode layer.

(Step of Forming Contact Layer)

Contact layer 51 may be formed by, for example, a cold spraying method, thermal spraying, plating, vapor deposition, or the like. The contact layer may be formed to selectively cover the end surface of the anode foil or the cathode foil exposed from the exterior body and to cover the principal surface of the exterior body as little as possible.

In particular, the cold spraying method is a technique in which metal particles having a size of several μm to several tens of μm are accelerated from a subsonic speed to a supersonic speed by compressed gas such as air, nitrogen, and helium, and collide with a base material in a solid phase state to form a metal film. Although there is unknown part in the adhesion mechanism of the metal particles in the cold spraying method, it is generally considered that the metal particles or the metal base material are plastically deformed by the collision energy of the metal particles, and a newly formed surface is exposed on the metal surface to be activated.

When the cold spraying method is used, the contact layer is formed by causing metal particles to collide with each end surface at high speed. By using the cold spraying method, it is possible to realize a state in which the metal particles are hardly fixed to the resin base material, and to selectively form the contact layer on the first to fourth end surfaces. In this case, the resin base material is brittlely fractured by the collision energy of the metal particles, and the surface of the resin base material is scraped off. The contact layer thus can be selectively formed on the first end surface to the fourth end surface, and the corresponding principal surface of the exterior body can be roughened. Since the principal surface of the exterior body is roughened, the contact area between the exterior body and the external electrodes (or the intermediate electrode) increases, and the adhesion between the exterior body and the external electrodes (or the intermediate electrode) is improved by the anchor effect. As a result, it is possible to further enhance the reliability.

The metal particles may be particles of a metal having a lower ionization tendency than the metal constituting the anode body. For example, when the anode body is an Al foil, examples of such metal particles include Cu particles. In this case, the Cu particles that collide with the end surface of the first end at high speed break through the natural oxide film (Al oxide film) formed on the end surface, and a metal bond between Al and Cu can be formed. As a result, an alloy layer of Al and Cu can be formed at the interface between the contact layer and the first end. On the other hand, the surface of the contact layer is covered with a Cu layer which is a non-valve metal. Since Cu has a smaller ionization tendency than Al, the surface of the contact layer is hardly oxidized, and electrical connection with the external electrodes (or the anode electrode layer) can be reliably performed.

(Step of Forming Intermediate Electrode Layer)

Intermediate electrode layer 52 may be formed to cover any one of the first end surface to the fourth end surface or the contact layer and cover the corresponding principal surface of the exterior body.

The intermediate electrode layer may be formed by applying a conductive paste containing conductive particles and a resin material. Specifically, a conductive paste (for example, silver paste) is applied to each end surface by a dipping method, a transfer method, a printing method, a dispensing method, or the like, and then cured at a high temperature to form the intermediate electrode layer.

Alternatively, the intermediate electrode layer as a metal layer may be formed by electrolytic plating, electroless plating, a sputtering method, a vacuum vapor deposition method, a chemical vapor deposition (CVD) method, a cold spraying method, or a thermal spraying method.

The intermediate electrode layer may cover a part of a surface (for example, a top or bottom surface) orthogonal to the first to fourth principal surfaces of the exterior body.

The electrolytic capacitor illustrated in FIGS. 1A and 1B can be produced by the above production method. FIG. 1A corresponds to a sectional view taken along the line $X_1$-$X_2$ in FIG. 4, and FIG. 1B corresponds to a sectional view taken along the line $Y_1$-$Y_2$ in FIG. 4.

In the above exemplary embodiment, a plurality of cathode foils 20A processed into a shape having belt-like second region 22A extending in the second direction are arrayed in the first direction and placed on anode foil 10A to form an element assembly. Meanwhile, second region 22A may have a portion interconnecting the belt-shaped regions. In this case, it is easy to obtain the element assembly by positioning the cathode foil having the shape having the second region with respect to the anode foil and overlapping the cathode foil, and productivity can be improved.

Figure 5:
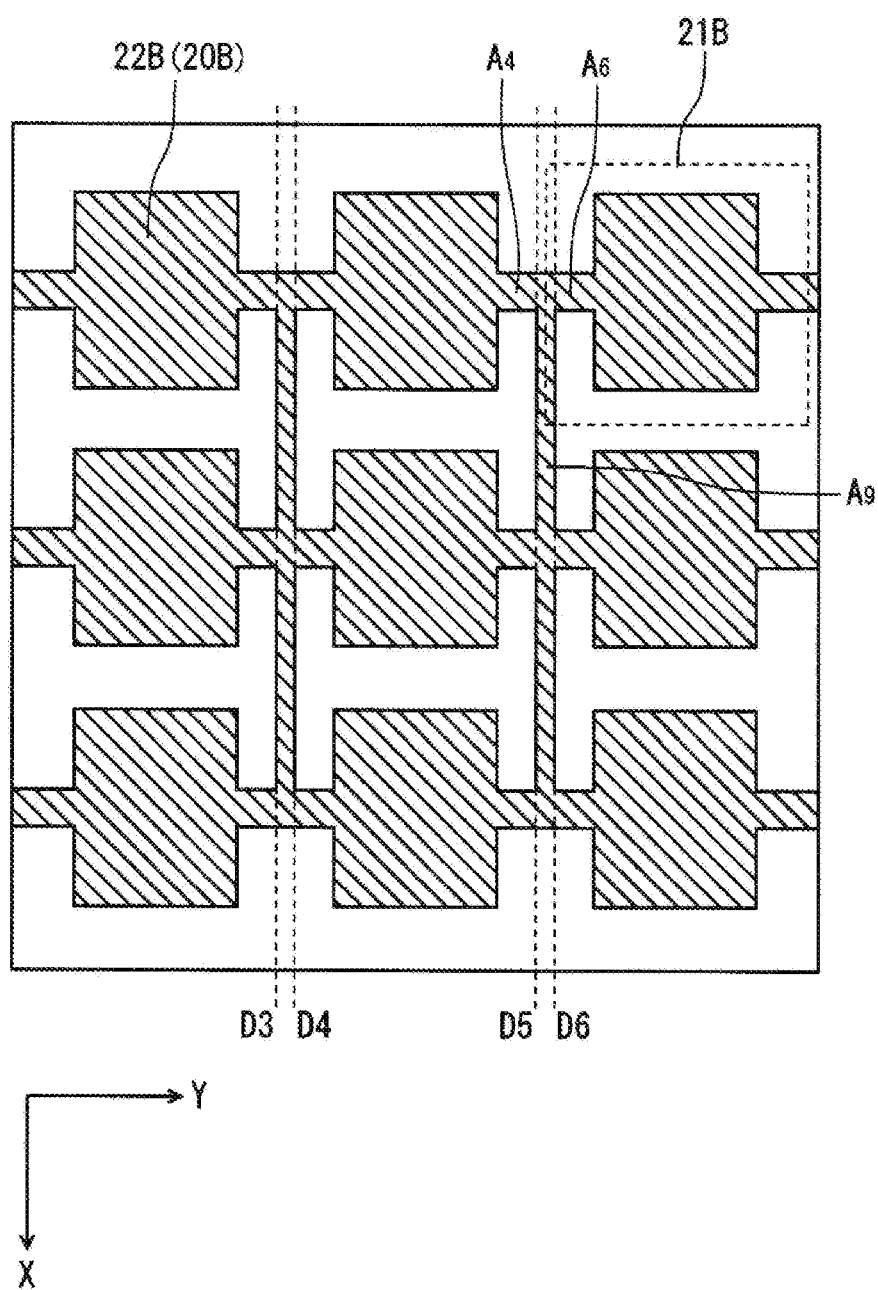
FIG. 5 is a layout diagram illustrating another example of the arrangement pattern of the cathode foil.

FIG. 5 is a diagram illustrating another example of the arrangement pattern of the cathode foil. In cathode pattern 21B illustrated in FIG. 5, interconnection region $A_9$ connecting second regions 22B arrayed in the first direction is provided between region $A_4$ and region $A_6$. In step (ix), by cutting the element assembly along lines D3 to D6, interconnection region $A_9$ is removed, and the end surface of the cathode foil is exposed in regions $A_4$ and $A_6$. One of the exposed end surfaces is the second end surface, and the other is the fourth end surface.

Figure 6:
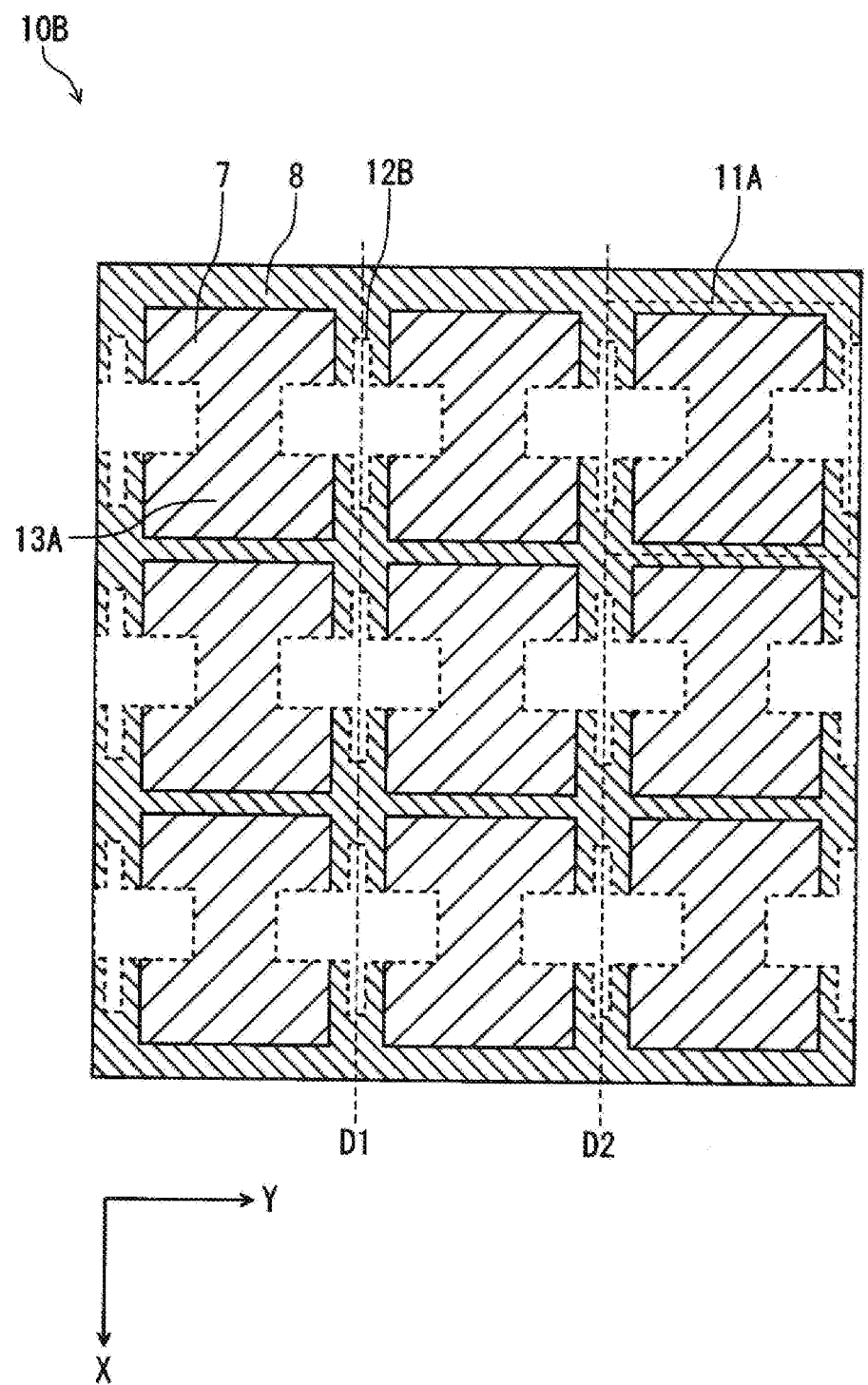
FIG. 6 is a layout diagram illustrating another example of the pattern of the anode foil.

In the above exemplary embodiment, when the element assembly is cut along lines D1 and D2 in FIG. 4 in step (ix), the end surface of the cathode foil can be exposed on the second principal surface and the fourth principal surface of the exterior body, and the end surface of the anode foil can be exposed on the first principal surface side or the third principal surface side of the second principal surface and the fourth principal surface. The end surfaces of the anode foil exposed on the second principal surface and the fourth principal surface may be subjected to an anodizing treatment to be insulated. Alternatively, anode foil 10B illustrated in FIG. 6 may be used to obtain the element assembly. In anode pattern 11B illustrated in FIG. 6, first opening 12B extends in the first direction outside region $A_2$ or region $A_7$. In step (ix), by cutting the element assembly along lines D1 and D2 in such a manner as to cross the portion extending in the first direction of first opening 12B, it is possible to restrict the exposure of the end surface of the anode foil on the second principal surface and the fourth principal surface.

Second Exemplary Embodiment

The method for producing an electrolytic capacitor according to the present exemplary embodiment may further include, in the step of obtaining the element assembly, a step of obtaining a first anode foil by forming a second opening that extends in the second direction and is arranged in a first pattern, and a step of obtaining a second anode foil by forming the second opening that is arranged in a second pattern different from the first pattern.

Figure 7A:
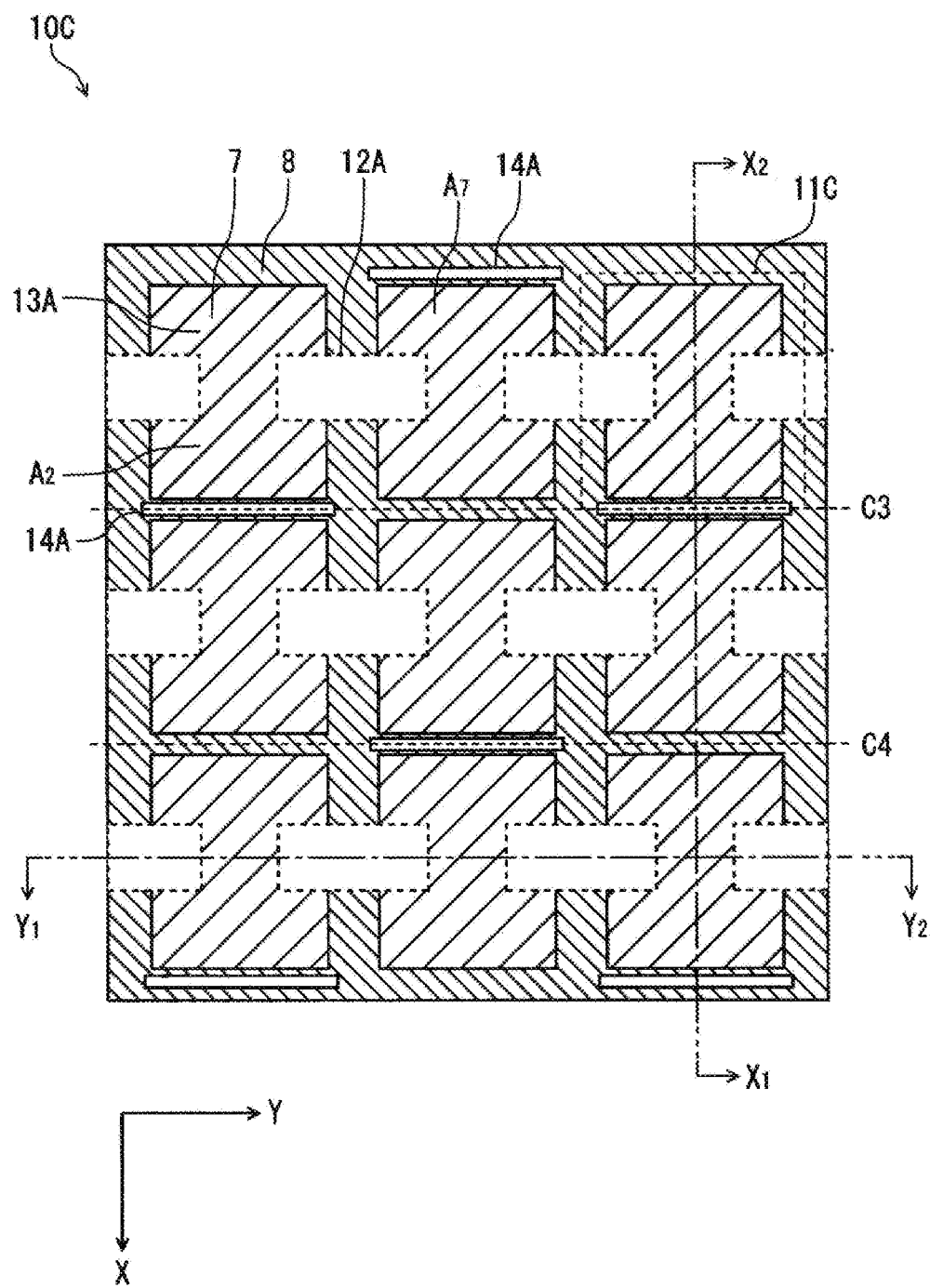
FIG. 7A is a layout diagram schematically illustrating a pattern of a first anode foil used for producing an electrolytic capacitor according to a second exemplary embodiment of the present disclosure.
Figure 7B:
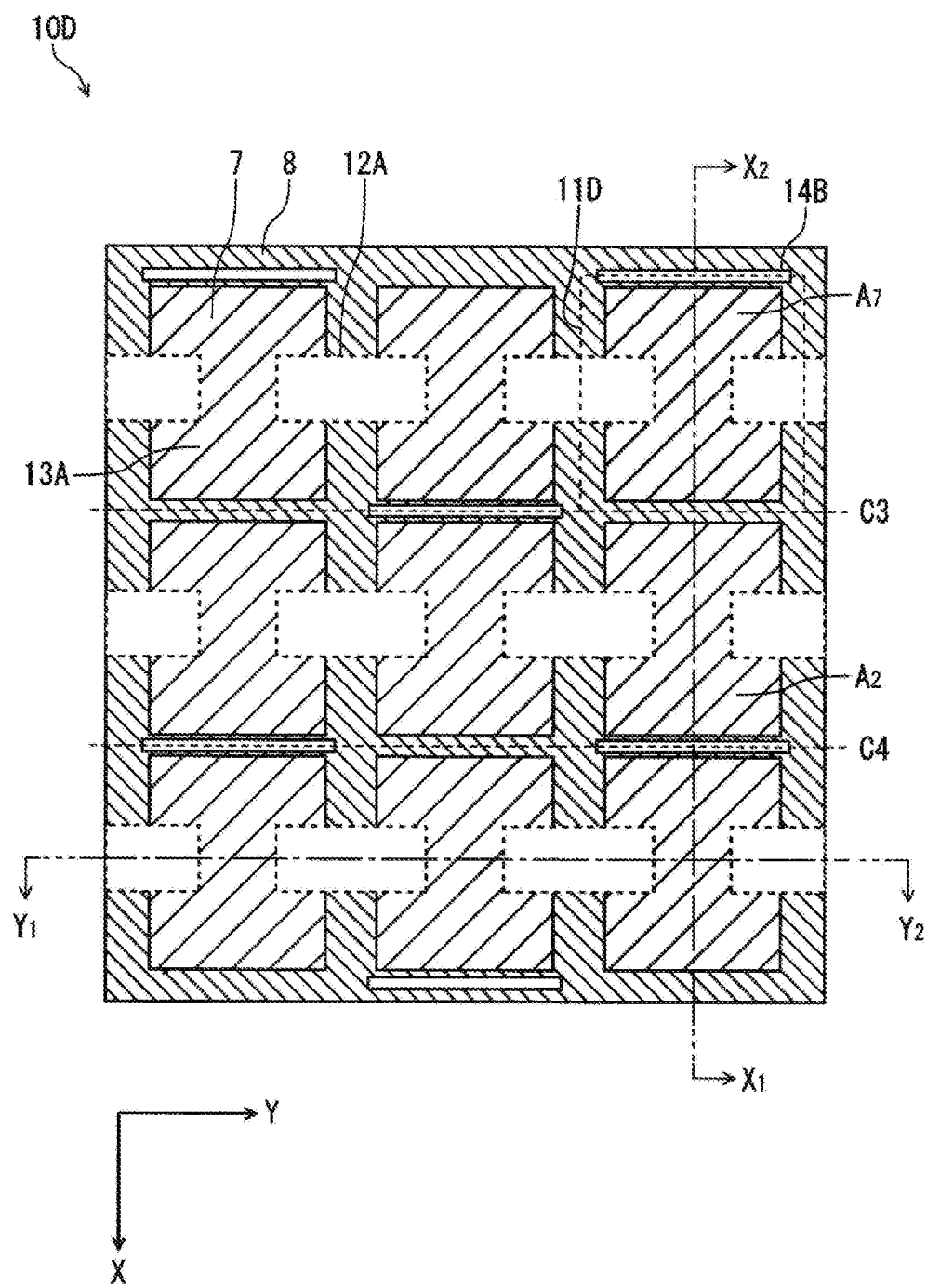
FIG. 7B is a layout diagram schematically illustrating a pattern of a second anode foil used for producing the electrolytic capacitor according to the second exemplary embodiment of the present disclosure.

FIGS. 7A and 7B are diagrams each illustrating an example of the pattern of the anode foil for forming the element assembly in the present exemplary embodiment. In FIG. 7A, anode foil 10C has a pattern in which anode pattern 11C is periodically repeated in the first direction (X direction) and the second direction (Y direction). In FIG. 7B, anode foil 10D has a pattern in which anode pattern 11D is periodically repeated in the first direction (X direction) and the second direction (Y direction). In FIGS. 7A and 7B, a pattern of first opening 12A formed in step (iii) and a pattern of solid electrolyte layer 7 and insulating film (resist) 8 formed in step (iv) are illustrated. These patterns are similar to the patterns of first opening 12A, solid electrolyte layer 7, and insulating film (resist) 8 in FIG. 2A, and detailed description is omitted.

As illustrated in FIG. 7A, second opening 14A is disposed in anode pattern 11C. In anode pattern 11C, second opening 14A extends in the second direction in a region that is outside first region 13A and is opposite to region $A_1$ with respect to region $A_2$, or in a region that is outside first region 13A and is opposite to region $A_1$ with respect to region $A_7$.

As illustrated in FIG. 7B, second opening 14B is disposed in anode pattern 11D. Also in anode pattern 11D, similarly to anode pattern 11C, second opening 14A extends in the second direction in a region that is outside first region 13A and is opposite to region $A_1$ with respect to region $A_2$, or in a region that is outside first region 13A and is opposite to region $A_1$ with respect to region $A_7$. However, in anode foil 10D, second opening 14B is not formed in a region corresponding to a region where second opening 14A is formed in anode foil 10C, and is formed in a region corresponding to a region where second opening 14A is not formed in anode foil 10C.

When anode foil 10C or 10D is used, the element assembly may be divided by cutting the element assembly along a cutting line parallel to the second direction in such a manner as to cross the region where second openings 14A and/or 14B are formed (step (viii)). In this case, the end surface of the anode foil is not exposed from the exterior body at a side close to the region where second opening 14A or 14B is formed. Hence, the end surface of the anode foil is exposed only on one of the first principal surface and the third principal surface of the exterior body to be electrically connected to the external electrode.

For example, in step (vi), the anode foils and the cathode foils are alternately stacked in the order of anode foil 10C, cathode foil 20A, anode foil 10D, and cathode foil 20A to obtain an element assembly. In step (viii), the obtained element assembly is cut along cutting lines C3 and C4 that are parallel to the second direction and cross the region where second openings 14A and 14B are formed. In this case, in the element stack body obtained after the division, the anode foil (first anode foil) whose end surface is exposed only at the first principal surface of the exterior body and the anode foil (second anode foil) whose end surface is exposed only at the third principal surface of the exterior body are alternately stacked with the cathode foil interposed therebetween.

Second opening 14A and/or 14B may be formed to extend in the first direction to cross region $A_2$ and/or the region $A_7$. However, from the viewpoint of maintaining the capacitance, it is preferable that second openings 14A and/or 14B are not formed in a region corresponding to second region 22A of the cathode foil. That is, it is preferable that second openings 14A and/or 14B do not overlap regions corresponding to ends in the first direction of region $A_5$ or region $A_8$ of the cathode foil.

In the examples of FIGS. 7A and 7B, when the pattern of second opening 14A in anode foil 10C is rotated by 180 degrees (or the front and back surfaces are reversed), the pattern of second opening 14A coincides with the pattern of second opening 14B in anode foil 10D. Anode foil 10C (first anode foil) thus matches anode foil 10D (second anode foil) by being rotated by 180 degrees. Anode foil 10C and anode foil 10D therefore do not need to be prepared separately, and two sets of the same anode foil may be provided, one set may be used as the first anode foil, and the other set rotated by 180 degrees (or the front and back surfaces are reversed) may be used as the second anode foil.

Figure 8A:
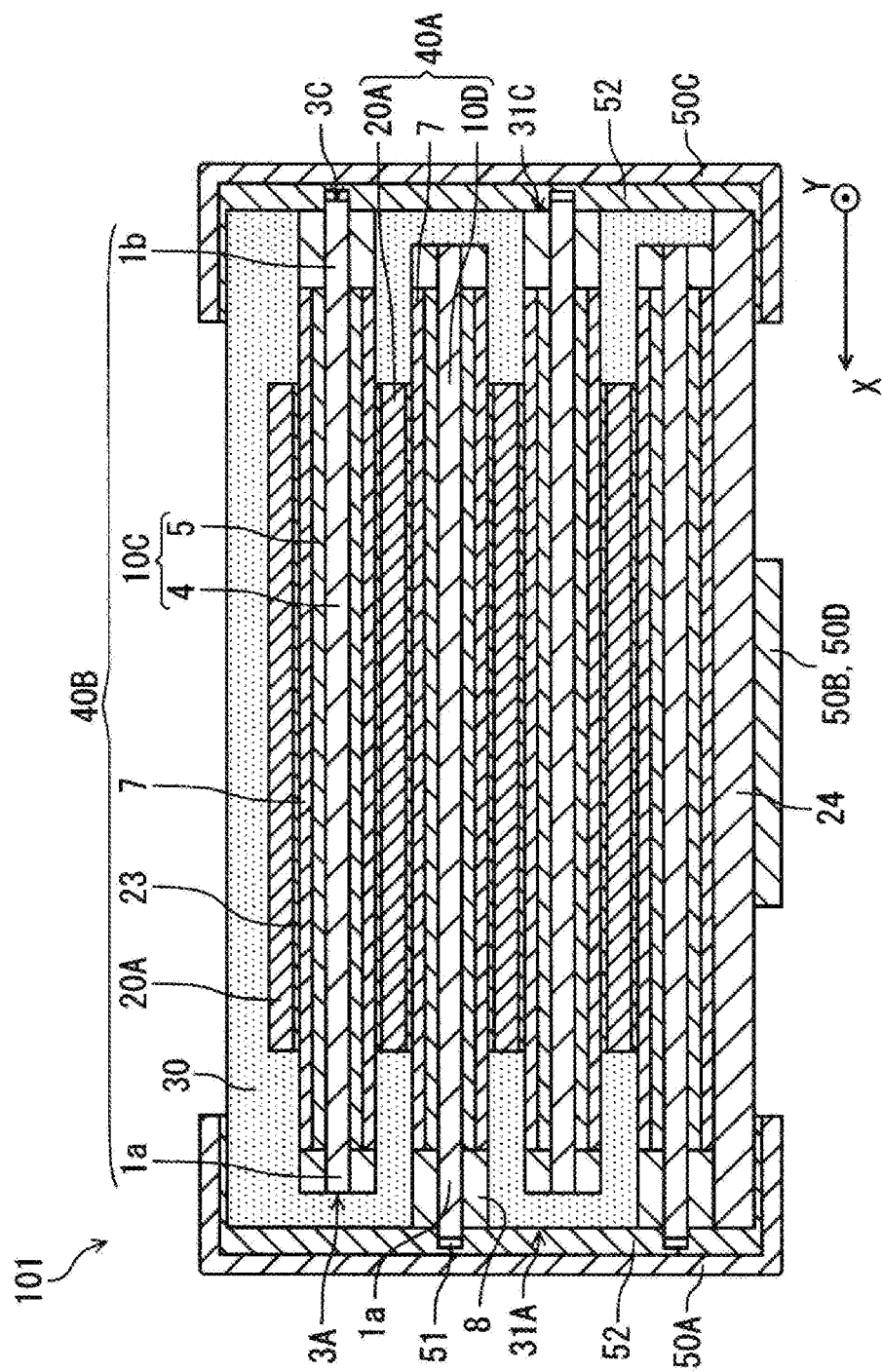
FIG. 8A is a sectional view schematically illustrating a structure of a solid electrolytic capacitor according to a second exemplary embodiment of the present disclosure.

FIGS. 8A and 8B are sectional views schematically illustrating a structure of electrolytic capacitor 101 produced in this manner. FIG. 8A corresponds to a sectional view taken along the line $X_1$-$X_2$ in FIGS. 7A and 7B, and FIG. 8B corresponds to a sectional view taken along the line $Y_1$-$Y_2$ in FIGS. 7A and 7B.

Similarly to electrolytic capacitor 100 of the first exemplary embodiment illustrated in FIGS. 1A and 1B, electrolytic capacitor 101 includes anode foils 10C and 10D as anode bodies, solid electrolyte layer 7, and cathode foil 20A. The anode foil and the cathode foil are alternately stacked with the solid electrolyte layer interposed therebetween. Anode foil 10C and anode foil 10D are alternately stacked with cathode foil 20A and solid electrolyte layer 7 interposed therebetween.

As illustrated in FIG. 8A, end surface 3A of one 1a of the pair of first ends of anode foil 10C is covered with exterior body 30, and end surfaces of anode foil 10C are not exposed at first principal surface 31A of exterior body 30. On the other hand, end surface 3C of other one 1b of the pair of first ends of anode foil 10C is exposed from exterior body 30 at third principal surface 31C of exterior body 30 to be electrically connected to external electrode 50C through contact layer 51 and intermediate electrode layer 52.

The end surface of one 1a of the pair of first ends of anode foil 10D is exposed from exterior body 30 at first principal surface 31A of exterior body 30 to be electrically connected to external electrode 50A through contact layer 51 and intermediate electrode layer 52. On the other hand, the end surface of other one 1b of the pair of first ends of anode foil 10D is covered with exterior body 30, and end surfaces of anode foil 10D are not exposed at third principal surface 31C of exterior body 30.

One capacitor element 40A (first capacitor element) is constituted by anode foil 10D, solid electrolyte layer 7, and cathode foil 20A facing anode foil 10D with solid electrolyte layer 7 interposed therebetween. On the other hand, one capacitor element 40B (second capacitor element) is also constituted by anode foil 10C, solid electrolyte layer 7, and cathode foil 20A facing anode foil 10C with solid electrolyte layer 7 interposed therebetween.

Current in the anode foil of capacitor element 40A and current in the anode foil of capacitor element 40B flow in reverse direction with each other in the first direction (X direction). Thus, the magnetic field generated by the current flowing through first capacitor element 40A and the magnetic field generated by the current flowing through second capacitor element 40B cancel each other in the first direction, and the magnetic flux generated in electrolytic capacitor 101 decreases. As a result, the ESL is reduced.

In FIGS. 8A and 8B, the anode foil and the cathode foil are alternately stacked with the solid electrolyte layer interposed therebetween, but the anode foil and the cathode foil are not necessarily alternately stacked as long as the anode foil exposed at first principal surface 31A and not exposed at third principal surface 31C and the anode foil exposed at third principal surface 31C and not exposed at first principal surface 31A are stacked.

Third Exemplary Embodiment

The method for producing an electrolytic capacitor according to the present exemplary embodiment further includes the step of obtaining a first cathode foil in which region $A_4$ extends from region $A_3$ in one direction along the second direction, and a step of obtaining a second cathode foil in which region $A_4$ extends from region $A_3$ in the other direction along the second direction. In step (vi), an anode foil, the first cathode foil, an anode foil, and the second cathode foil are stacked in this order to obtain an element assembly.

Figure 9A:
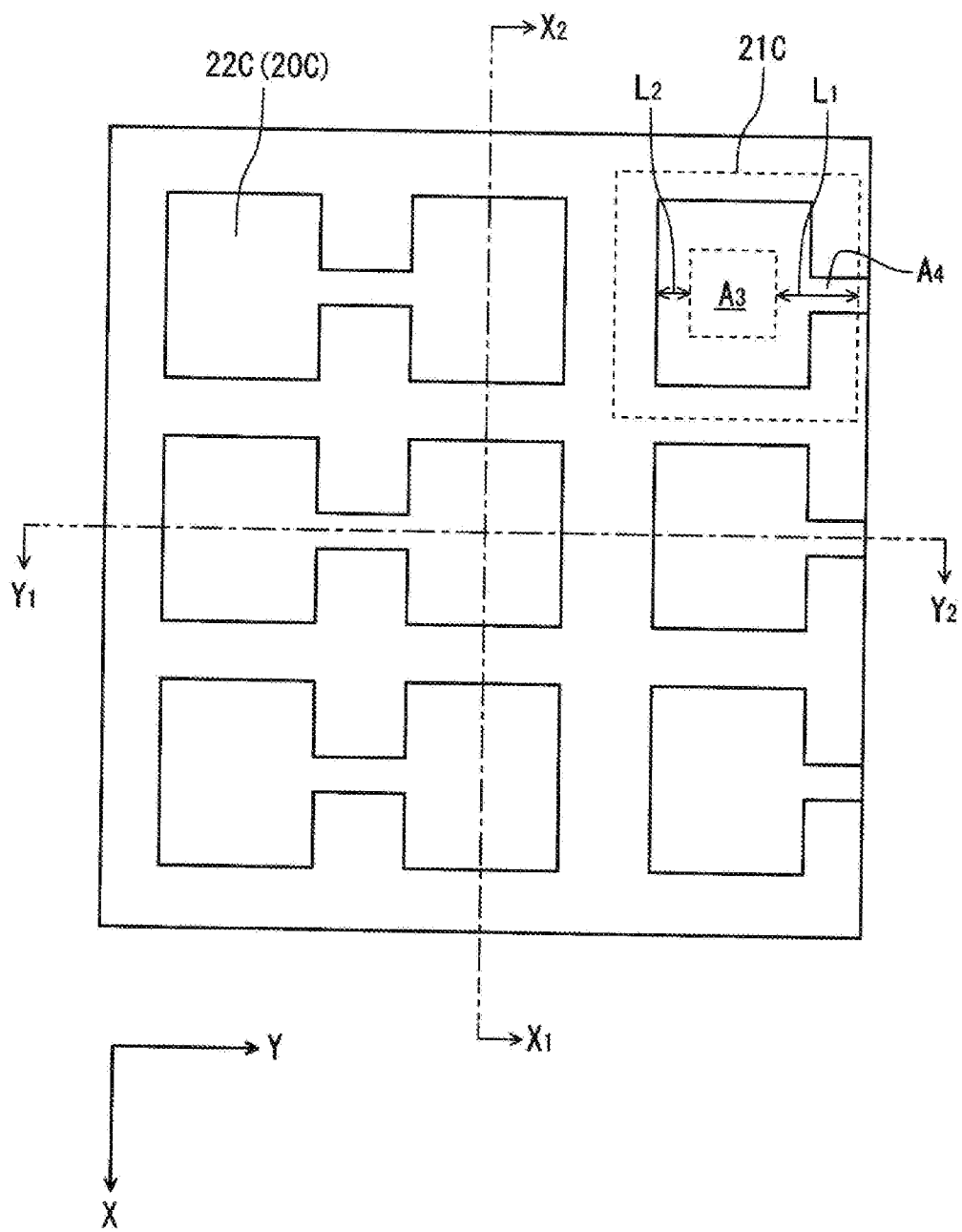
FIG. 9A is a layout diagram schematically illustrating an arrangement pattern of a first cathode foil used for producing an electrolytic capacitor according to a third exemplary embodiment of the present disclosure.
Figure 9B:
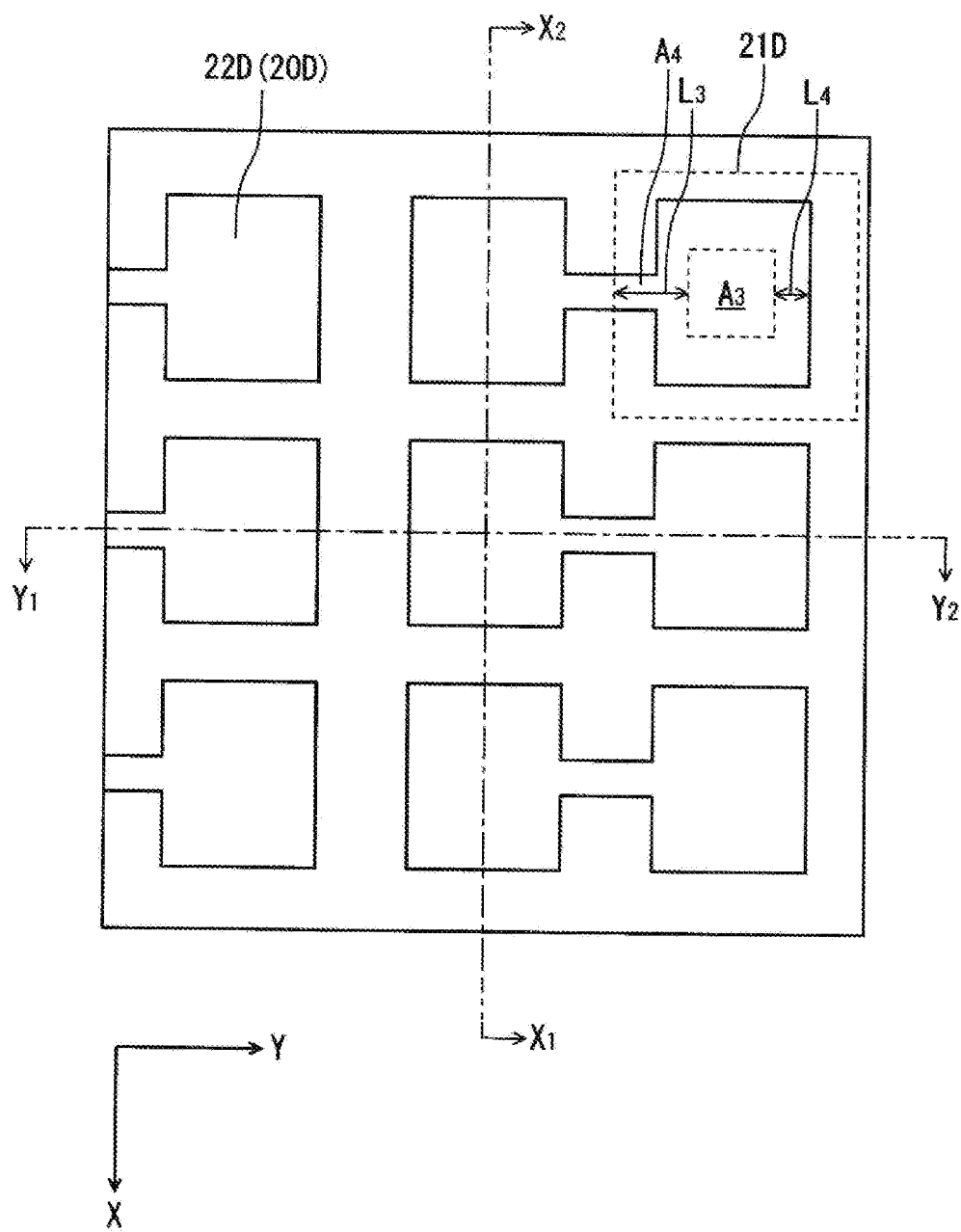
FIG. 9B is a layout diagram schematically illustrating an arrangement pattern of a second cathode foil used for producing the electrolytic capacitor according to the third exemplary embodiment of the present disclosure.

FIGS. 9A and 9B are diagrams each illustrating an example of a shape and an arrangement pattern of the cathode foil for forming the element assembly in the present exemplary embodiment. In FIG. 9A, cathode foil 20C (first cathode foil) overlaps the anode foil in an arrangement pattern in which cathode pattern 21C is periodically repeated in the first direction (X direction) and the second direction (Y direction). In FIG. 9B, cathode foil 20D (second cathode foil) overlaps the anode foil in an arrangement pattern in which cathode pattern 21D is periodically repeated in the first direction (X direction) and the second direction (Y direction).

In FIG. 9A, cathode foil 20C is present in region 22C (second region). In region 22C, region $A_4$ protrudes from region $A_3$ in one direction along the second direction in cathode pattern 21C. On the other hand, region 22C does not protrude in the other direction along the second direction in cathode pattern 21C.

In FIG. 9B, cathode foil 20D is present in region 22D (second region). In region 22D, region $A_4$ protrudes from region $A_3$ in the other direction along the second direction in cathode pattern 21D. On the other hand, region 22D does not protrude in one direction along the second direction in cathode pattern 21D. That is, region $A_4$ protrudes from region $A_3$ in the second direction in both region 22C and region 22D, but the protruding directions are opposite.

For example, in step (vi), anode foils and cathode foils are alternately stacked in the order of anode foil 10A, cathode foil 20C, anode foil 10A, and cathode foil 20D to obtain an element assembly. In step (ix), the obtained element assembly is cut along a straight line parallel to the first direction (X direction) to divide the element assembly. The cutting line is, for example, a straight line extending in the first direction constituting the contour lines of cathode pattern 21C and cathode pattern 21D. In this case, in the element stack body obtained after the division, the cathode foil (first cathode foil) whose end surface is exposed only at the second principal surface of the exterior body and the cathode foil (second cathode foil) whose end surface is exposed only at the fourth principal surface of the exterior body are alternately stacked with the anode foil interposed therebetween.

Cathode foil 20C may have region $A_6$ extending in the other direction along the second direction from region $A_3$. In this case, extension distance $L_2$ in the other direction along the second direction from region $A_3$ of region $A_6$ is preferably shorter than extension distance $L_1$ in the one direction along the second direction from region $A_3$ of region $A_4$ so that the end surface of cathode foil 20C is exposed only at one of the second principal surface and the fourth principal surface in step (ix). Similarly, cathode foil 20D may have region $A_6$ extending in one direction along the second direction from region $A_3$. In this case, extension distance $L_4$ in one direction along the second direction from region $A_3$ of region $A_6$ may be made shorter than extension distance $L_3$ in the other direction along the second direction from region $A_3$ of region $A_4$ so that the end surface of cathode foil 20D is exposed only at one of the second principal surface and the fourth principal surface in step (ix).

Figure 10A:
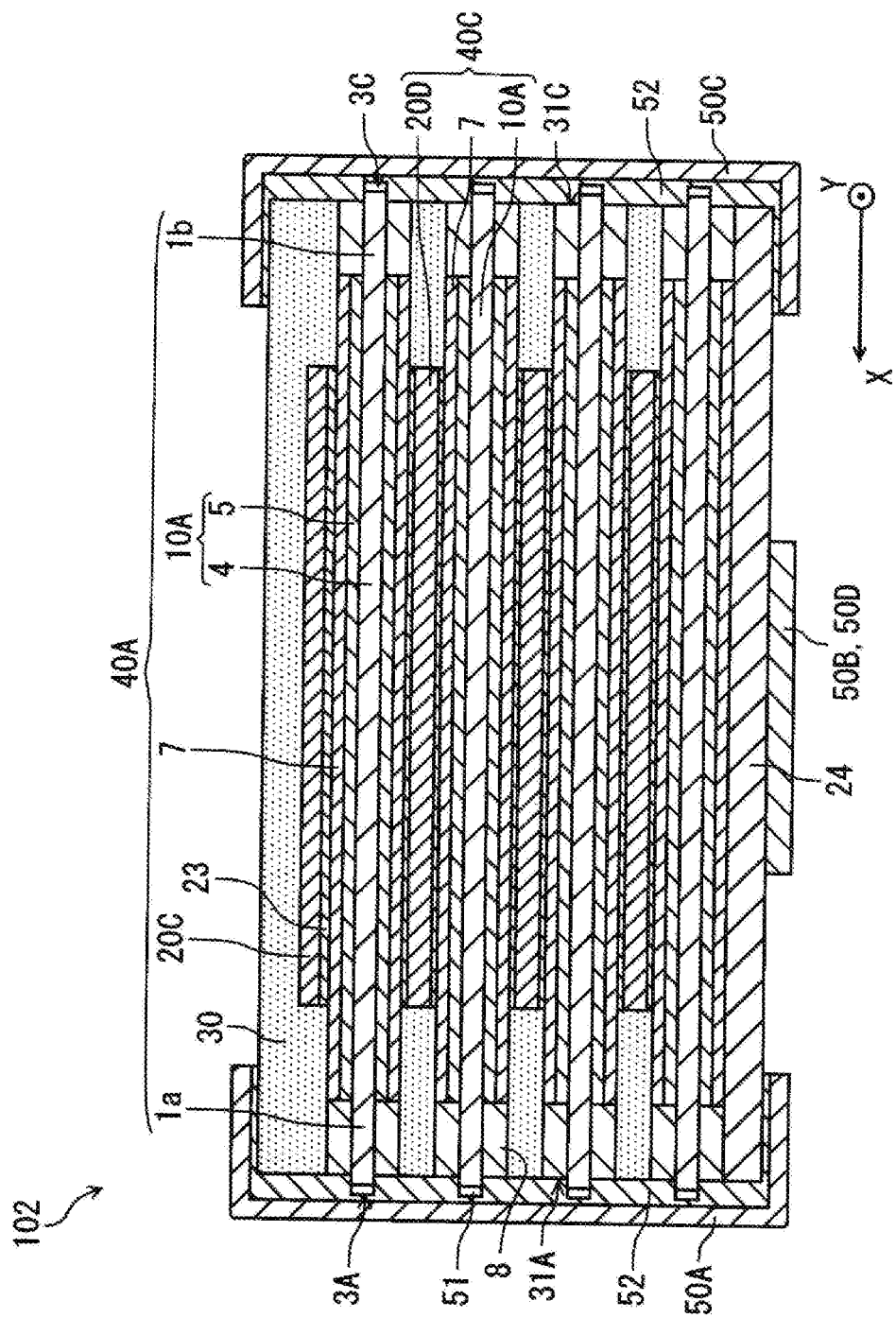
FIG. 10A is a sectional view schematically illustrating a structure of a solid electrolytic capacitor according to the third exemplary embodiment of the present disclosure.
Figure 10B:
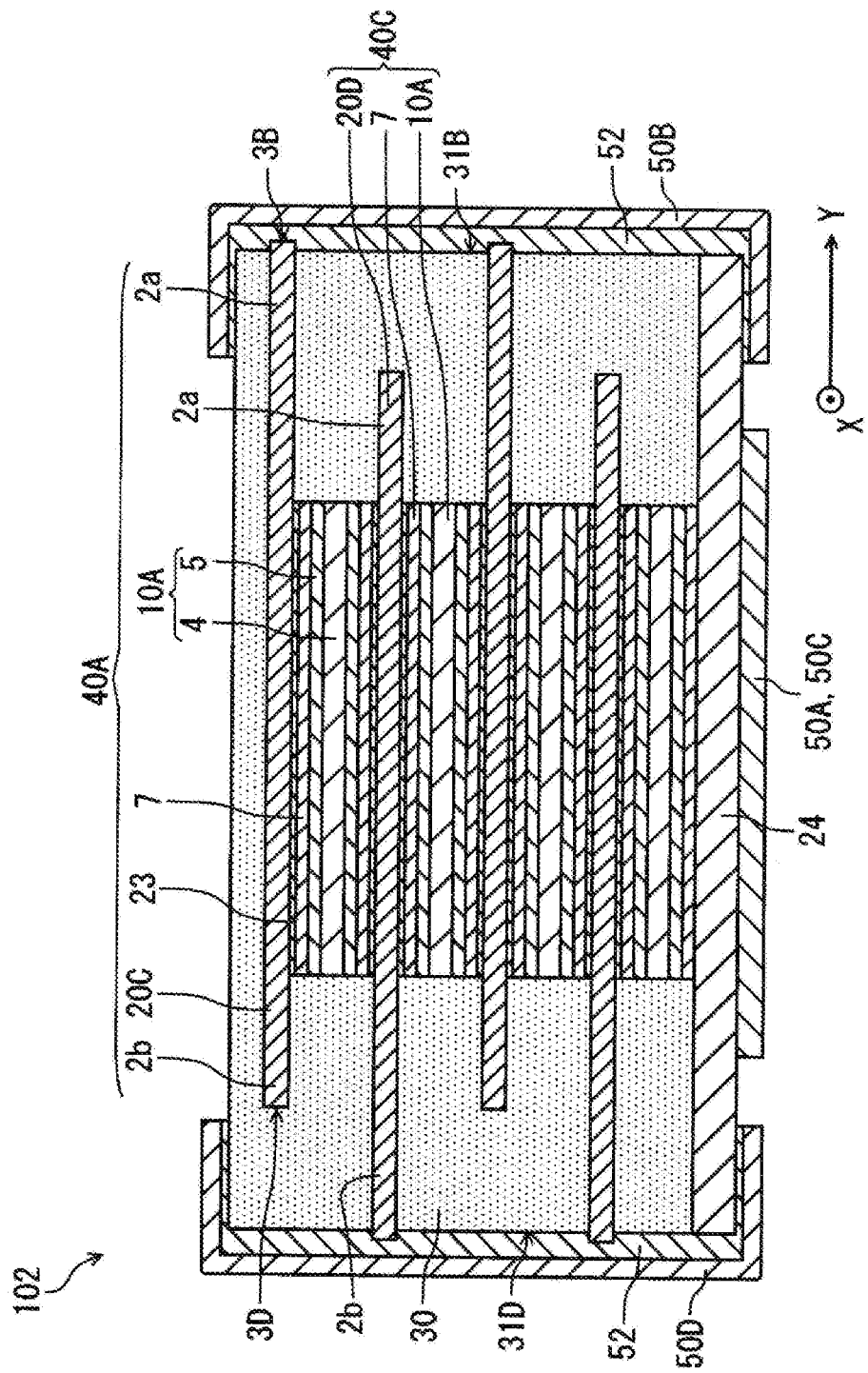
FIG. 10B is a sectional view schematically illustrating a structure of the solid electrolytic capacitor according to the third exemplary embodiment of the present disclosure.

FIGS. 10A and 10B are sectional views schematically illustrating a structure of electrolytic capacitor 102 produced in this manner. FIG. 10A corresponds to a sectional view taken along the line $X_1$-$X_2$ in FIGS. 9A and 9B, and FIG. 10B corresponds to a sectional view taken along the line $Y_1$-$Y_2$ in FIGS. 9A and 9B.

Similarly to electrolytic capacitor 100 of the first exemplary embodiment illustrated in FIGS. 1A and 1B, electrolytic capacitor 102 includes anode foil 10A as an anode body, solid electrolyte layer 7, and cathode foils 20C and 20D. The anode foil and the cathode foil are alternately stacked with the solid electrolyte layer interposed therebetween. Cathode foil 20C and cathode foil 20D are alternately stacked with anode foil 10A and solid electrolyte layer 7 interposed therebetween.

As illustrated in FIG. 10B, end surface 3B of one 2a of the pair of second ends of cathode foil 20C is exposed from exterior body 30 at second principal surface 31B of exterior body 30 to be electrically connected to external electrode 50B through contact layer 51 and intermediate electrode layer 52. On the other hand, end surface 3D of the other one 2b of the pair of second ends of cathode foil 20C is covered with exterior body 30, and end surfaces of cathode foil 20C are not exposed at fourth principal surface 31D of exterior body 30.

The end surface of one 2a of the pair of second ends of cathode foil 20D is covered with exterior body 30, and the end surfaces of cathode foil 20D are not exposed at second principal surface 31B of exterior body 30. On the other hand, the end surface of the other one 2b of the pair of second ends of cathode foil 20D is exposed from exterior body 30 at fourth principal surface 31D of exterior body 30 to be electrically connected to external electrode 50D through contact layer 51 and intermediate electrode layer 52.

One capacitor element 40A (first capacitor element) is constituted by anode foil 10A, solid electrolyte layer 7, and cathode foil 20C facing anode foil 10A with solid electrolyte layer 7 interposed therebetween. On the other hand, one capacitor element 40C (third capacitor element) is also constituted by anode foil 10A, solid electrolyte layer 7, and cathode foil 20D facing anode foil 10A with solid electrolyte layer 7 interposed therebetween.

Current in the cathode foil of capacitor element 40A and current in the cathode foil of capacitor element 40C flow in reverse direction with each other in the second direction (Y direction). Thus, the magnetic field generated by the current flowing through first capacitor element 40A and the magnetic field generated by the current flowing through third capacitor element 40C cancel each other in the second direction, and the magnetic flux generated in electrolytic capacitor 102 decreases. As a result, the ESL is reduced.

Fourth Exemplary Embodiment

Figure 11A:
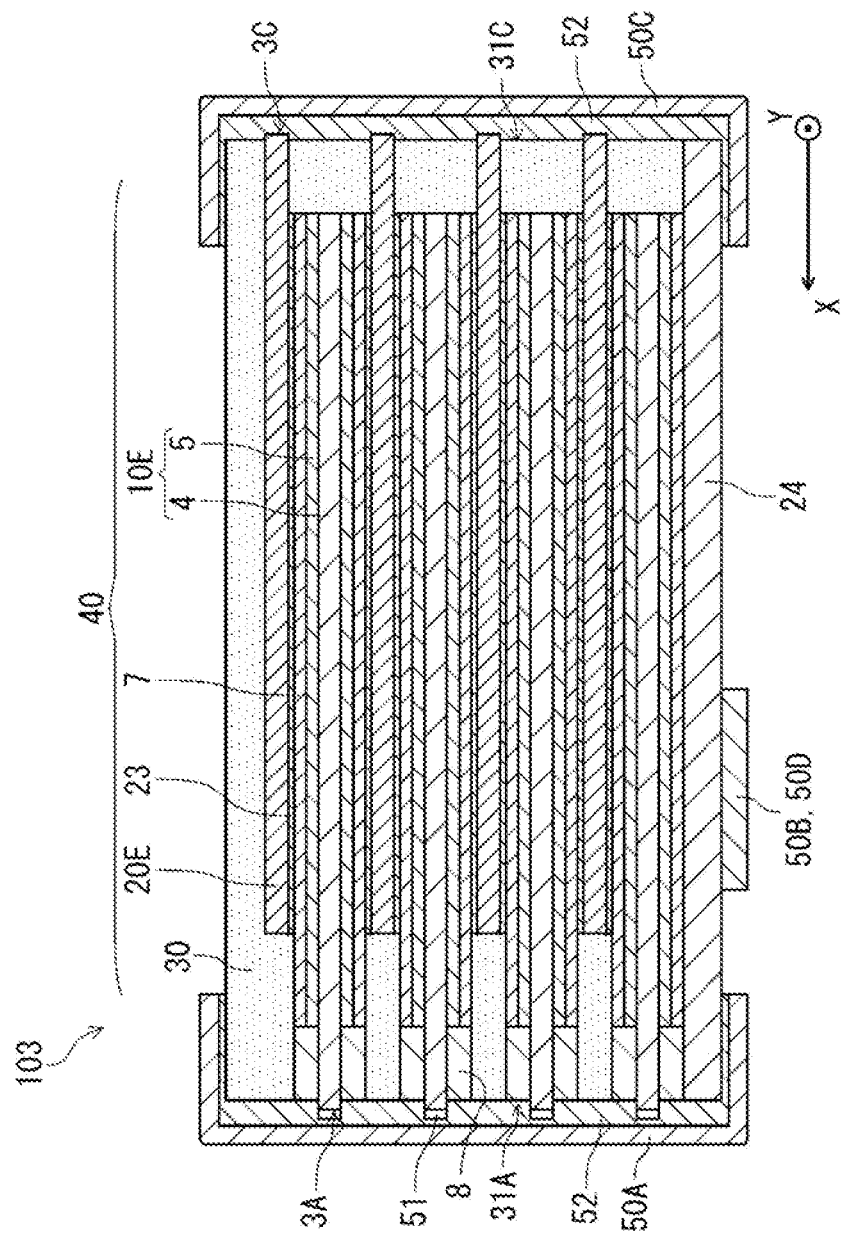
FIG. 11A is a sectional view schematically illustrating a structure of a solid electrolytic capacitor according to a fourth exemplary embodiment of the present disclosure.
Figure 11B:
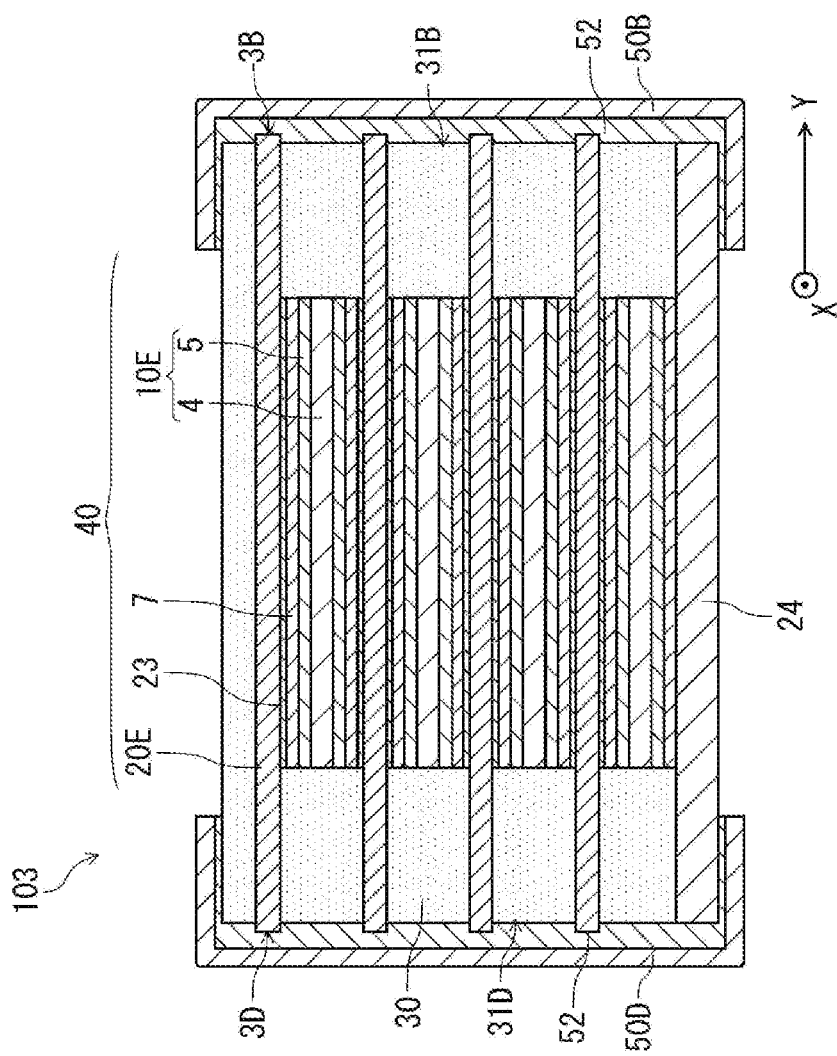
FIG. 11B is a sectional view schematically illustrating a structure of the solid electrolytic capacitor according to the fourth exemplary embodiment of the present disclosure.
Figure 12:
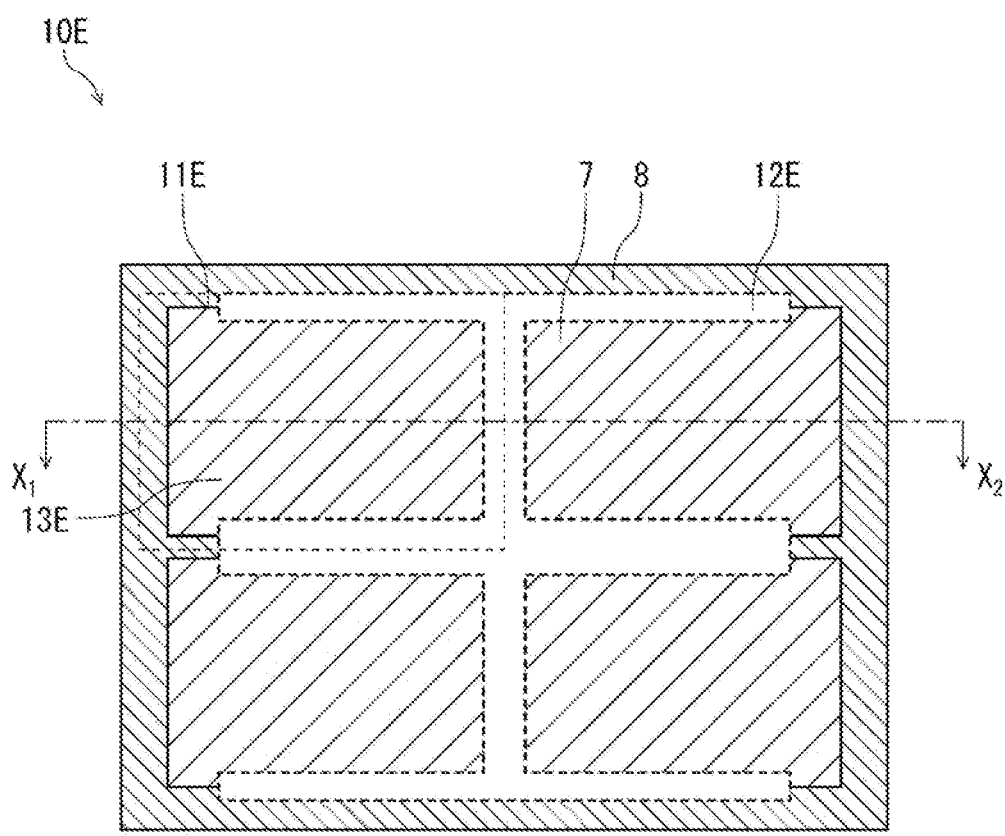
FIG. 12 is a layout diagram schematically illustrating a pattern of an anode foil used for producing the electrolytic capacitor according to the fourth exemplary embodiment of the present disclosure.
Figure 13:
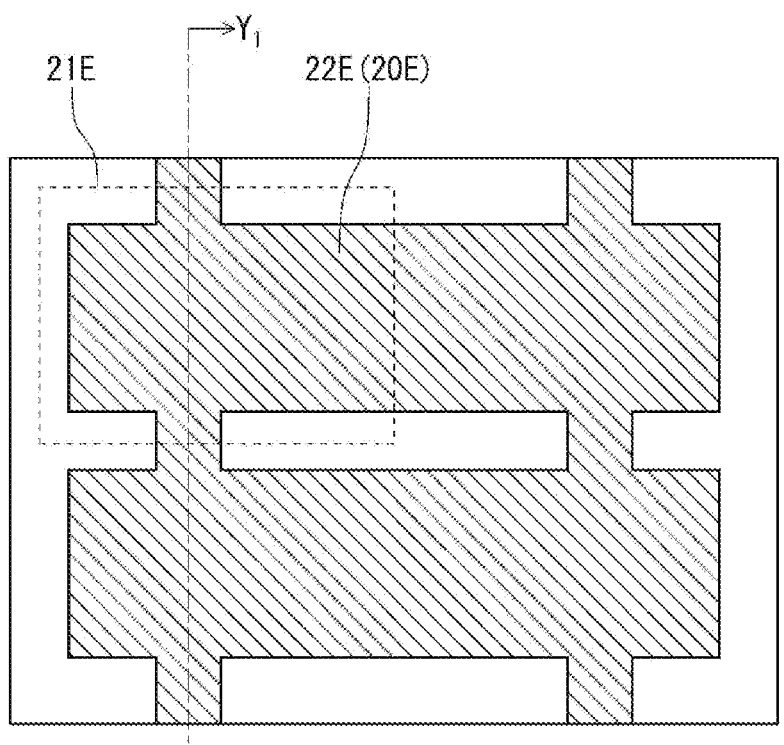
FIG. 13 is a layout diagram schematically illustrating an arrangement pattern of a cathode foil used for producing the electrolytic capacitor according to the fourth exemplary embodiment of the present disclosure.

FIGS. 11A and 11B are diagrams illustrating another configuration example of the electrolytic capacitor according to the present exemplary embodiment. FIGS. 11A and 11B are sectional views schematically illustrating a structure of electrolytic capacitor 103 according to the present exemplary embodiment. Electrolytic capacitor 103 is produced, for example, by alternately stacking anode foil 10E having anode pattern 11E illustrated in FIG. 12 and cathode foil 20E having cathode pattern 21E illustrated in FIG. 13 to obtain an element stack body. In FIG. 12, anode pattern 11E includes first opening 12E, first region 13E where solid electrolyte layer 7 is formed, and a pattern of insulating film (resist) 8. FIG. 11A corresponds to a sectional view taken along the line $X_1$-$X_2$ in FIG. 12, and FIG. 11B corresponds to a sectional view taken along the line $Y_1$-$Y_2$ in FIG. 13.

As illustrated in FIGS. 11A and 11B, electrolytic capacitor 103 includes anode foil 10E as an anode body, solid electrolyte layer 7, and cathode foil 20E. Anode foil 10E and cathode foil 20E are alternately stacked with solid electrolyte layer 7 interposed therebetween. One capacitor element 40 (first capacitor element) is constituted by solid electrolyte layer 7 and anode foil 10E and cathode foil 20E facing each other with solid electrolyte layer 7 interposed therebetween. Electrolytic capacitor 103 includes an element stack body including a plurality of capacitor elements 40 in which a plurality of anode foils 10E and a plurality of solid electrolyte layers 7 are stacked with cathode foils 20E interposed therebetween. The element stack body is supported by substrate 24. Electrolytic capacitor 103 has a substantially rectangular parallelepiped outer shape, and a separation distance between first principal surface 31A and third principal surface 31C is longer than a separation distance between second principal surface 31B and fourth principal surface 31D.

As illustrated in FIG. 11A, anode foil 10E has a region covered with solid electrolyte layer 7 and a region not covered with solid electrolyte layer 7. In anode foil 10E, an end (anode lead-out part) of the region not covered with solid electrolyte layer 7 is exposed at first principal surface 31A of exterior body 30 to be electrically connected to first external electrode 50A through contact layer 51 and intermediate electrode layer 52.

On the other hand, ends of cathode foil 20E are exposed at second principal surface 31B, third principal surface 31C, and fourth principal surface 31D of exterior body 30. The exposed ends are electrically connected to second external electrode 50B, third external electrode 50C, and fourth external electrode 50D through contact layer 51 and intermediate electrode layer 52, respectively. That is, in the present exemplary embodiment, first external electrode 50A is an anode electrode of electrolytic capacitor 103, and second external electrode 50B, third external electrode 50C, and fourth external electrode 50D are cathode electrodes of electrolytic capacitor 103.

In electrolytic capacitor 103, the end surfaces of the cathode foil exposed from the exterior body at second principal surface 31B and fourth principal surface 31D are located closer to first principal surface 31A than to third principal surface 31C. Thus, as illustrated in FIG. 11A, the distance between first external electrode 50A and second external electrode 50B is shorter than the distance between third external electrode 50C and second external electrode 50B. Similarly, the distance between first external electrode 50A and fourth external electrode 50D is shorter than the distance between third external electrode 50C and fourth external electrode 50D.

In this exemplary embodiment, the ESL of the electrolytic capacitor can be further reduced by disposing second external electrode 50B and fourth external electrode 50D, which are cathode electrodes, close to first external electrode 50A, which is an anode electrode. Second external electrode 50B and fourth external electrode 50D may be continuous at the bottom of electrolytic capacitor 103 to constitute one external electrode as a whole.

Figure 11C:
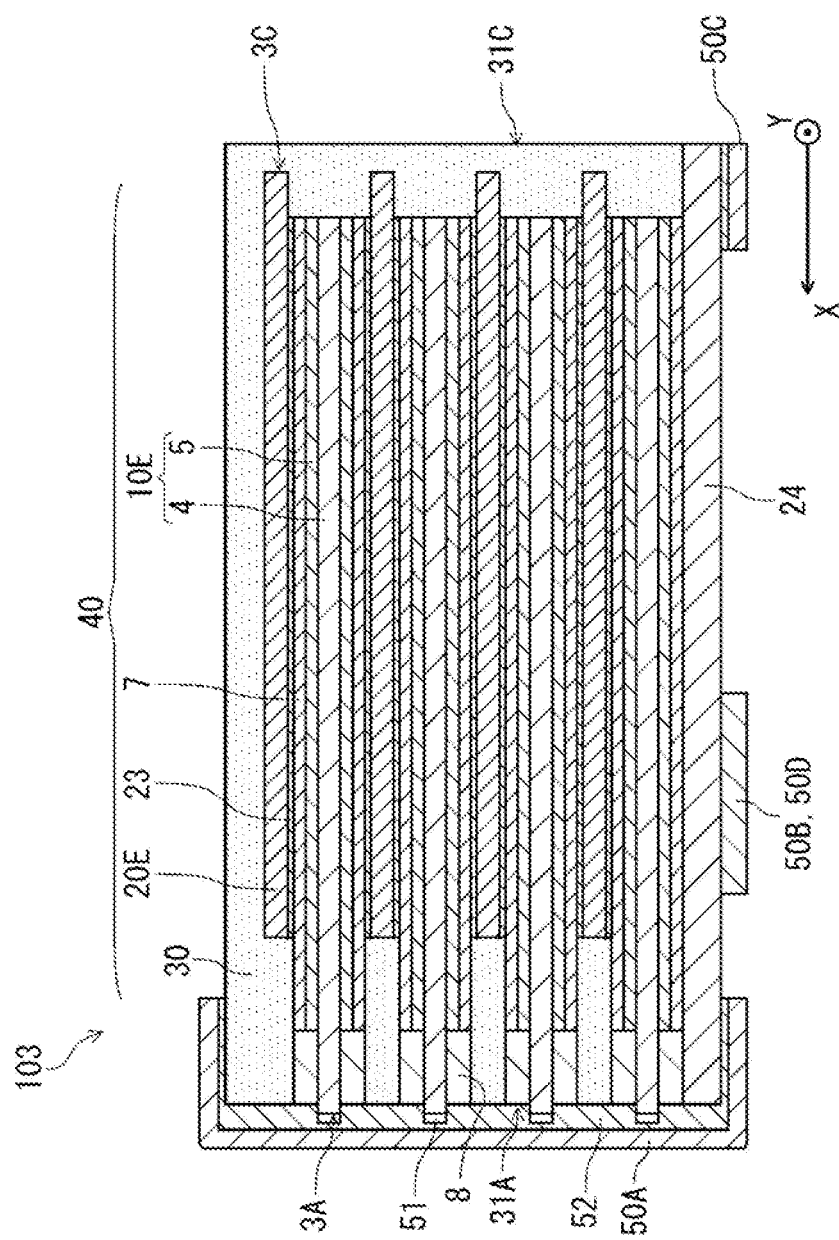
FIG. 11C is a sectional view schematically illustrating another example of the structure of the electrolytic capacitor according to the fourth exemplary embodiment of the present disclosure.

Third external electrode 50C does not have to be electrically connected to the end of the cathode foil. That is, the end surface of the cathode foil does not have to be exposed at third principal surface 31C of exterior body 30. When the end surface of the end of the anode foil of the end surface of the end of the cathode foil is not exposed at third principal surface 31C of exterior body 30, third external electrode 50C does not need to be disposed along third principal surface 31C. However, from the viewpoint of stably fixing the electrolytic capacitor to an external circuit board and inhibiting disconnection due to impact or vibration, third external electrode 50C may be disposed on at least the bottom surface on third principal surface 31C side of electrolytic capacitor 103. In this case, although not contributing to electrical connection, the electrolytic capacitor can be stably fixed to the external circuit board against impact or vibration by fixing third external electrode 50C on the bottom surface to the external circuit board. FIG. 11C is a sectional view of the electrolytic capacitor when third external electrode 50C is used as a dummy electrode in the structure of the electrolytic capacitor illustrated in FIG. 11A.

Fifth Exemplary Embodiment

Figure 14:
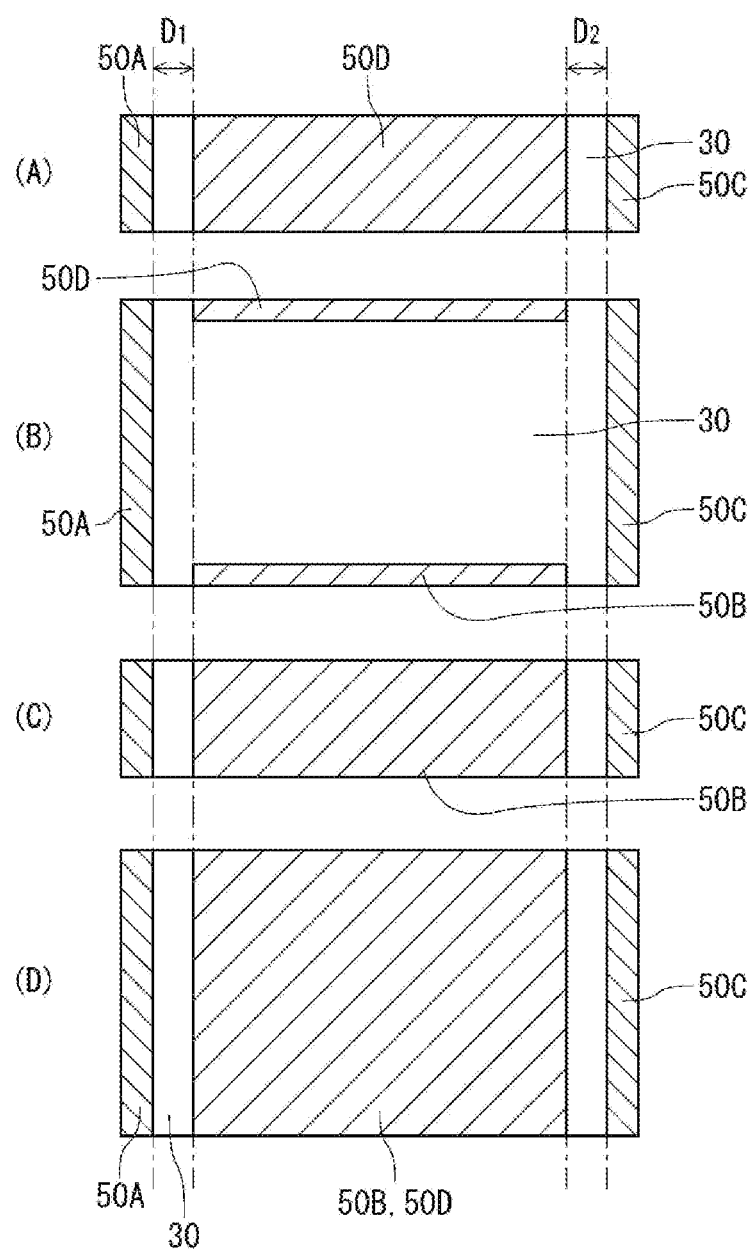
FIG. 14 is a diagram illustrating an example of a pattern of an external electrode formed on a surface of an electrolytic capacitor according to a fifth exemplary embodiment of the present disclosure.

FIG. 14 is a diagram illustrating an example of the pattern of first external electrode 50A, second external electrode 50B, third external electrode 50C, and fourth external electrode 50D formed on the surface of the electrolytic capacitor.

Figure 15:
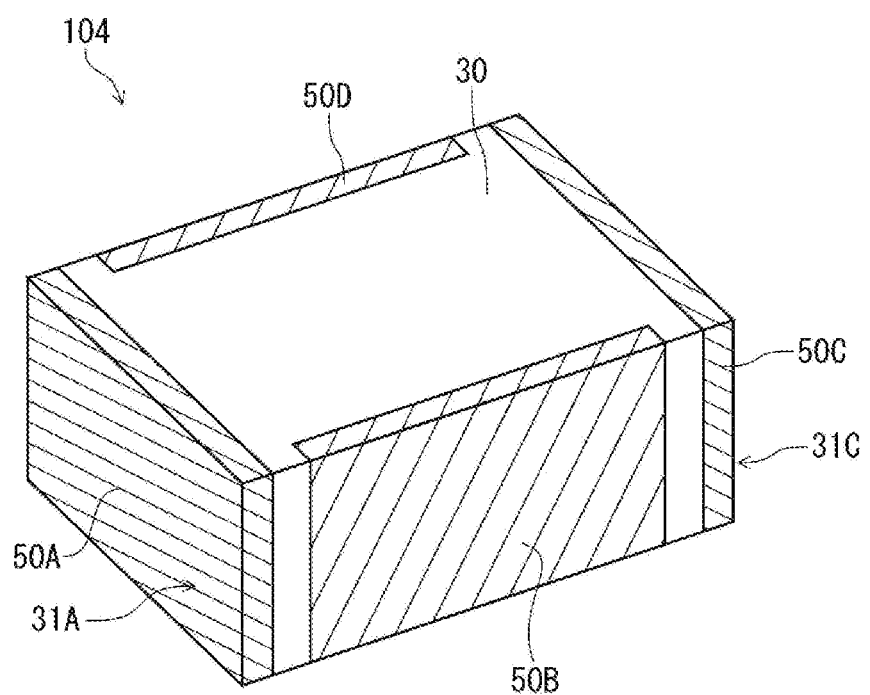
FIG. 15 is a perspective view schematically illustrating an external appearance of the electrolytic capacitor illustrated in FIG. 14.

FIG. 14 is a diagram illustrating an example of the pattern of the external electrodes formed in electrolytic capacitor 104 having a structure similar to that of the electrolytic capacitor illustrated in FIG. 1A, FIG. 1B, or FIG. 1C. In FIG. 14, a pattern on a right side surface (fourth principal surface 31D) of electrolytic capacitor 104 is shown in (A) of FIG. 14, a pattern on an upper surface of electrolytic capacitor 104 is shown in (B) of FIG. 14, a pattern on a left side surface (second principal surface 31B) of electrolytic capacitor 104 is shown in (C) of FIG. 14, and a pattern on a lower surface of electrolytic capacitor 104 is shown in (D) of FIG. 14. FIG. 15 is a perspective view schematically illustrating an external appearance of the electrolytic capacitor in FIG. 14.

The ESL can be reduced by shortening separation distance $D_1$ between first external electrode 50A and second external electrode 50B (fourth external electrode 50D) on the side surface and separation distance $D_2$ between third external electrode 50C and second external electrode 50B (fourth external electrode 50D) on the side surface. Each of separation distances $D_1$ and $D_2$ may range, for example, from 0.4 mm to 1.1 mm, inclusive.

As illustrated in FIGS. 14 and 15, second external electrode 50B may be formed to cover 50% or more of the side surface (second principal surface 31B), or fourth external electrode 50D may be formed to cover 50% or more of the side surface (fourth principal surface 31D). Second external electrode 50B and fourth external electrode 50D may be continuous at the lower surface (bottom surface) of the electrolytic capacitor to constitute one cathode terminal as a whole.

Figure 16:
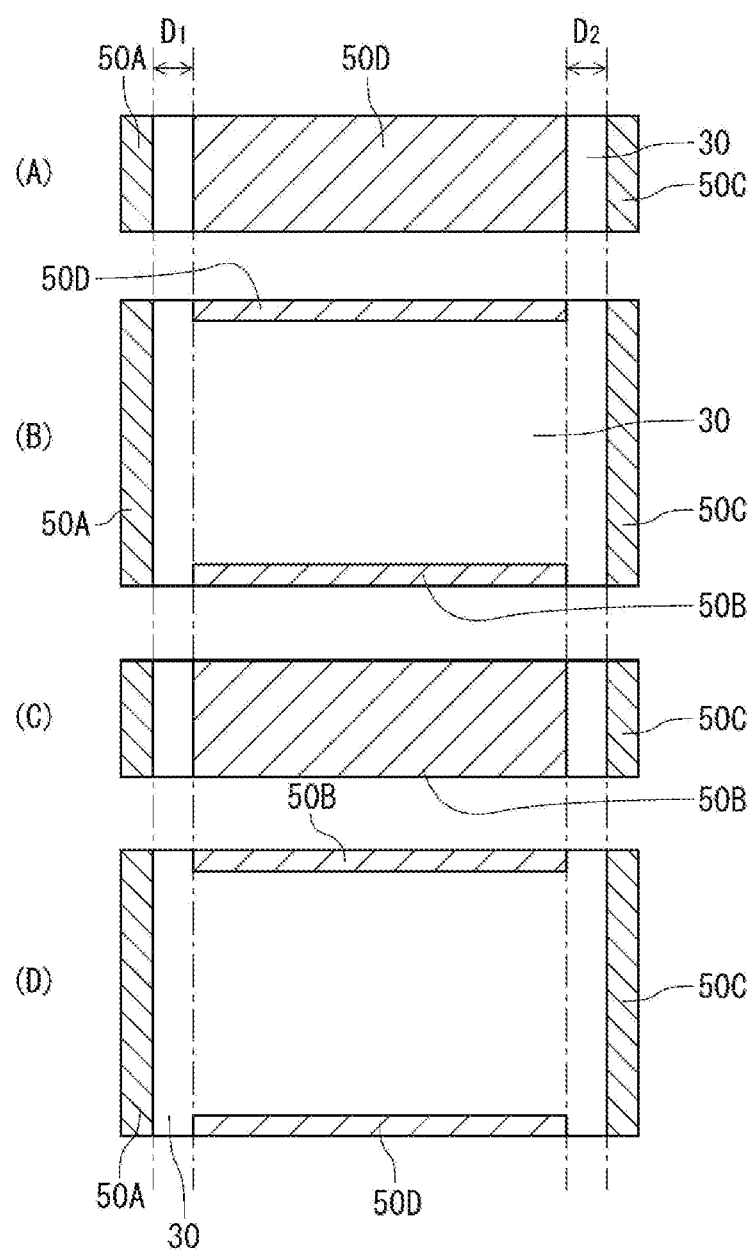
FIG. 16 is a diagram illustrating an example of a pattern of an external electrode formed on a surface of the electrolytic capacitor according to the fifth exemplary embodiment of the present disclosure.
Figure 17:
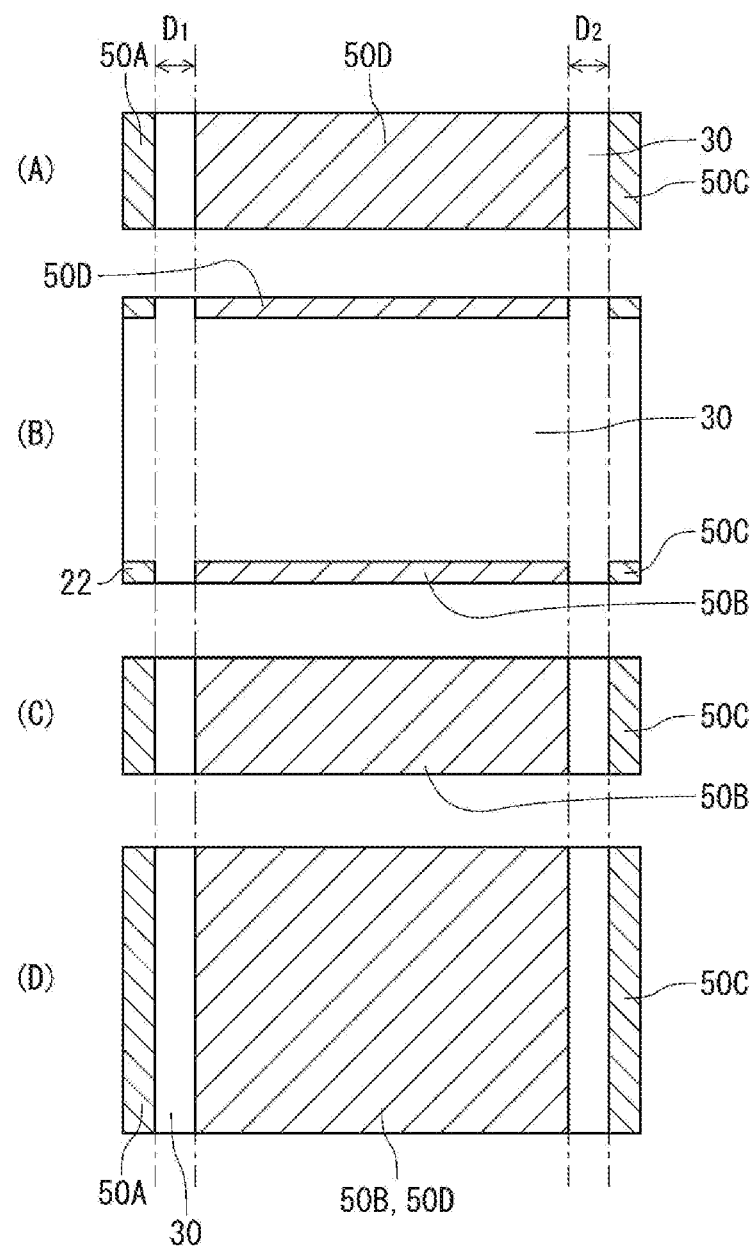
FIG. 17 is a diagram illustrating an example of a pattern of an external electrode formed on a surface of the electrolytic capacitor according to the fifth exemplary embodiment of the present disclosure.
Figure 18:
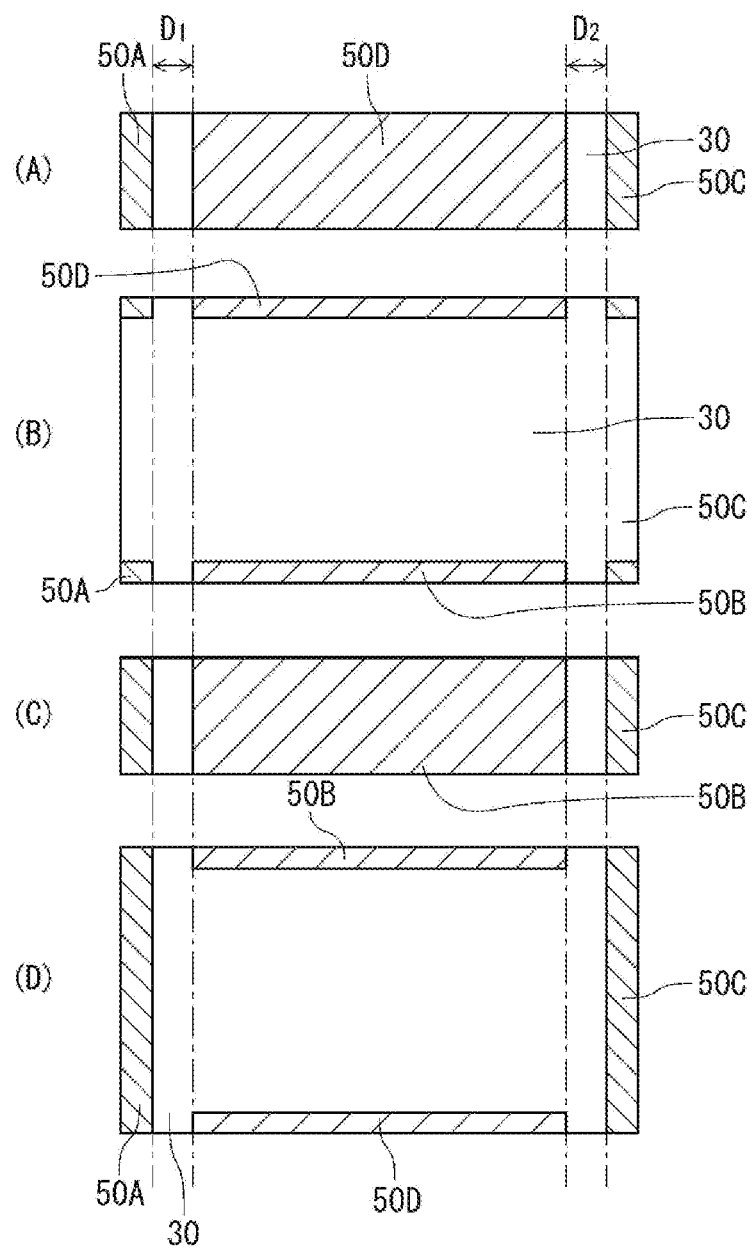
FIG. 18 is a diagram illustrating an example of a pattern of an external electrode formed on a surface of the electrolytic capacitor according to the fifth exemplary embodiment of the present disclosure.

FIGS. 16 to 18 are diagrams each illustrating another example of the pattern of first external electrode 50A, second external electrode 50B, third external electrode 50C, and fourth external electrode 50D formed on the surface of the electrolytic capacitor. In FIGS. 16 to 18, as in FIG. 14, a pattern on a right side surface (fourth principal surface 31D) of the electrolytic capacitor is shown in (A) of each of FIGS. 16 to 18, a pattern on an upper surface of the electrolytic capacitor is shown in (B) of each of FIGS. 16 to 18, a pattern on a left side surface (second principal surface 31B) of the electrolytic capacitor is shown in (C) of each of FIGS. 16 to 18, and a pattern on a lower surface of the electrolytic capacitor is shown in (D) of each of FIGS. 16 to 18.

As illustrated in FIGS. 16 and 18, second external electrode 50B and fourth external electrode 50D do not have to be connected on the lower surface (bottom surface), and may form two separated cathode terminals.

Figure 19:
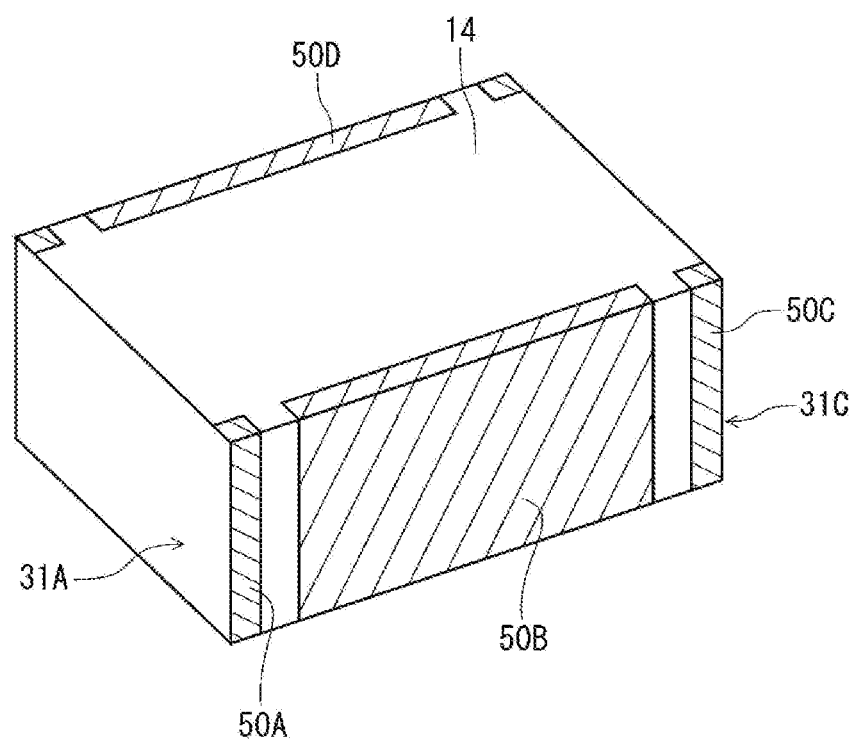
FIG. 19 is a perspective view schematically illustrating an external appearance of the electrolytic capacitor illustrated in FIG. 17 and FIG. 18.
Figure 20:
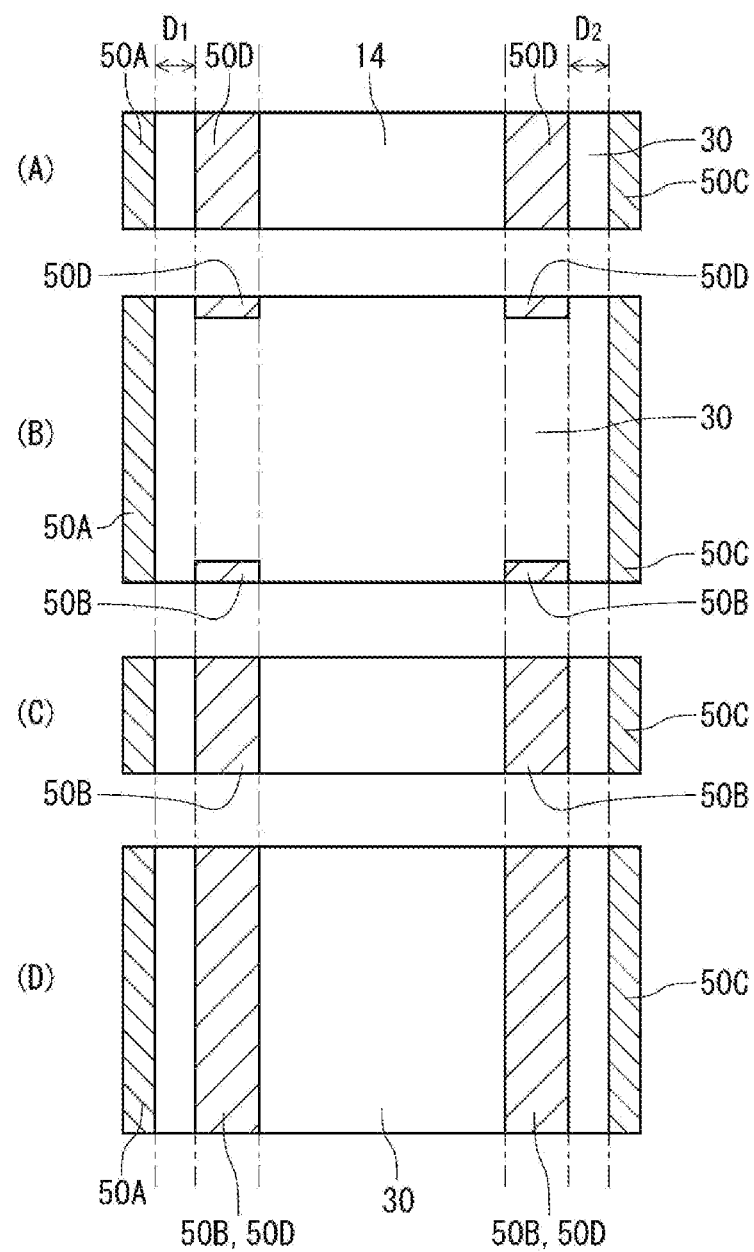
FIG. 20 is a diagram illustrating an example of a pattern of an external electrode formed on a surface of the electrolytic capacitor according to the fifth exemplary embodiment of the present disclosure.
Figure 21:
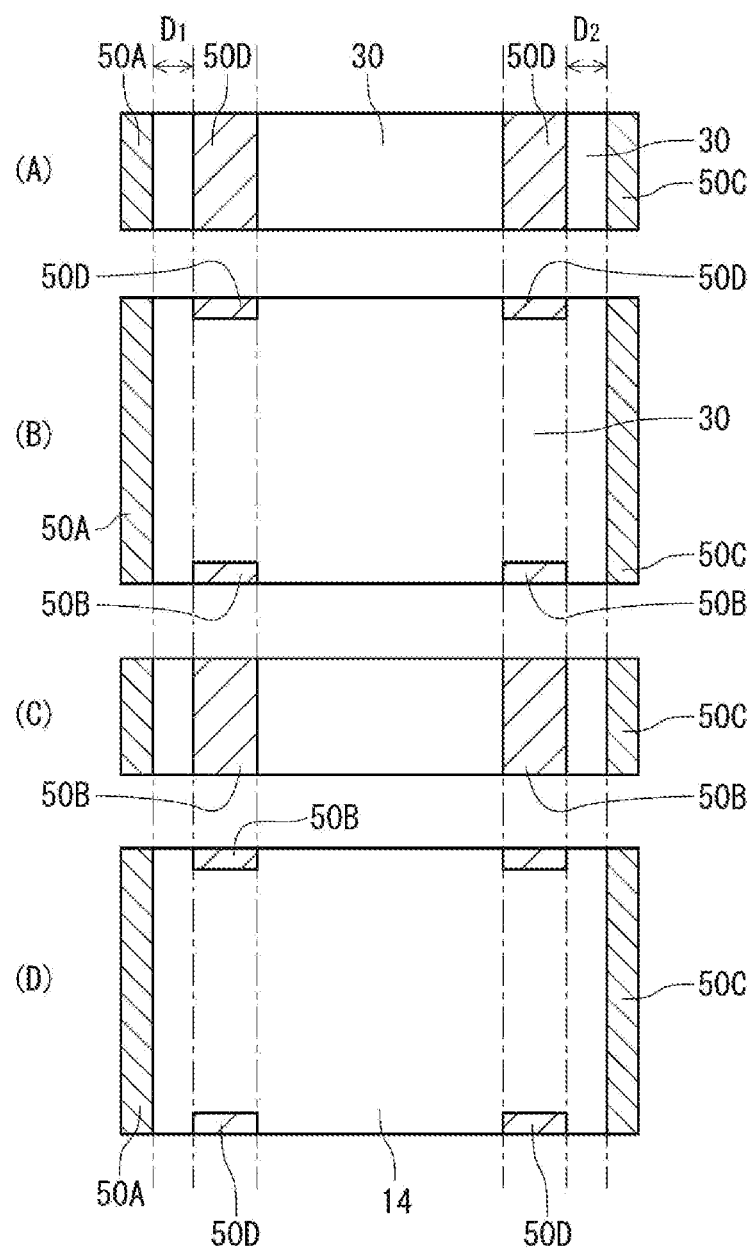
FIG. 21 is a diagram illustrating an example of a pattern of an external electrode formed on a surface of the electrolytic capacitor according to the fifth exemplary embodiment of the present disclosure.
Figure 22:
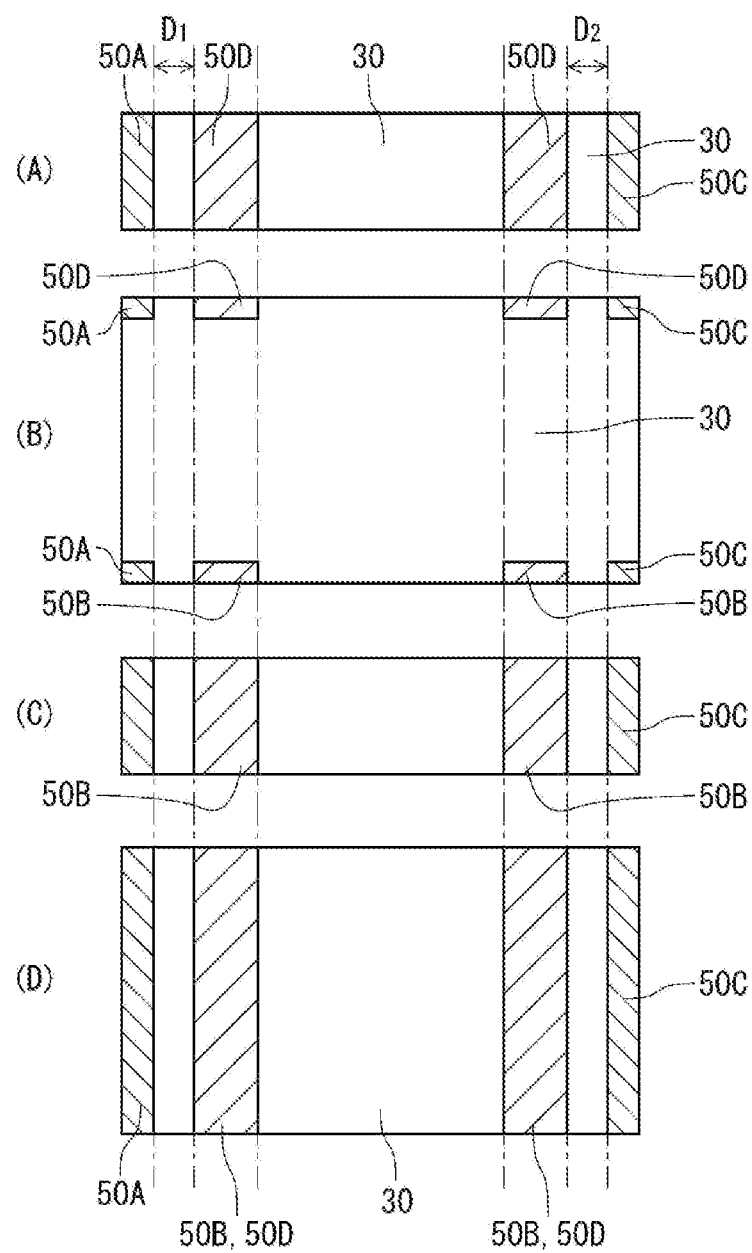
FIG. 22 is a diagram illustrating an example of a pattern of an external electrode formed on a surface of the electrolytic capacitor according to the fifth exemplary embodiment of the present disclosure.
Figure 23:
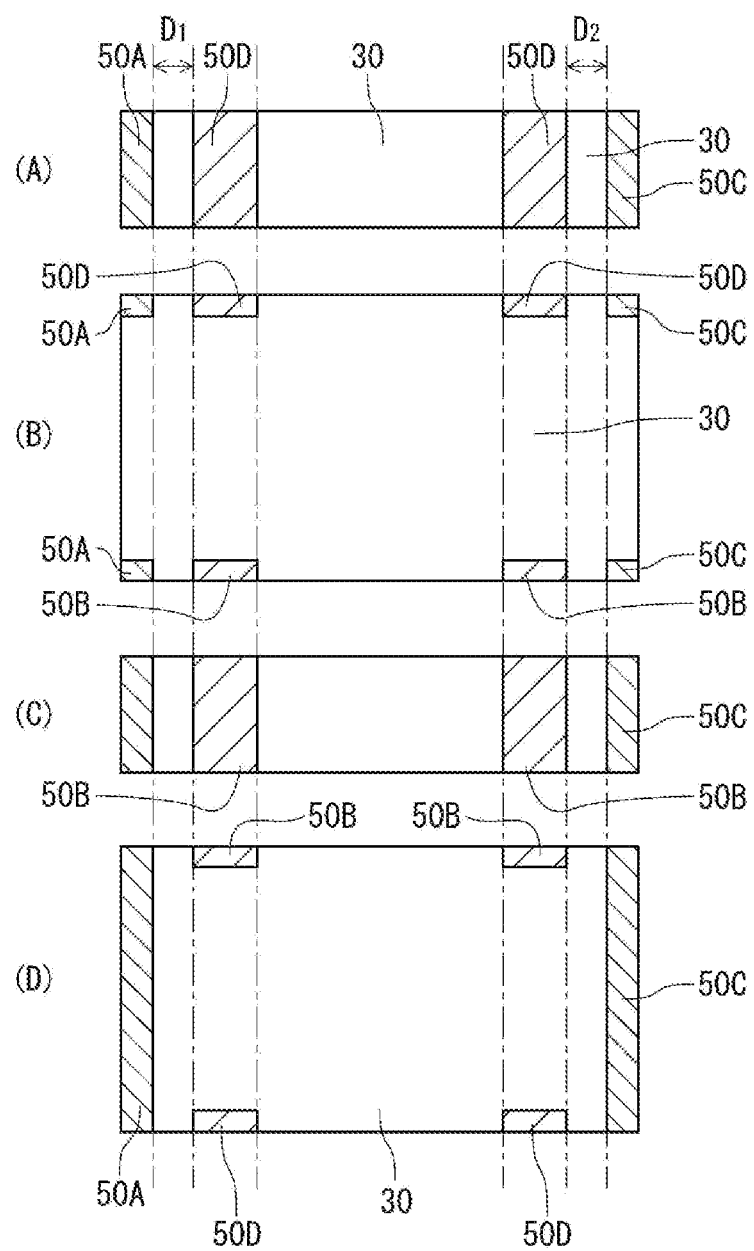
FIG. 23 is a diagram illustrating an example of a pattern of an external electrode formed on a surface of the electrolytic capacitor according to the fifth exemplary embodiment of the present disclosure.

FIG. 19 is a perspective view illustrating an appearance of the electrolytic capacitor in FIG. 17 or 18. As illustrated in FIG. 19, first external electrode 50A does not cover first principal surface 31A of the exterior body, but covers a part of second principal surface 31B and fourth principal surface 31D on the first principal surface 31A side. Similarly, third external electrode 50C does not cover third principal surface 31C of the exterior body, but covers a part of second principal surface 31B and fourth principal surface 31D on the third principal surface 31C side. First external electrode 50A is electrically connected to an end of the capacitor element at second principal surface 31B and fourth principal surface 31D. Third external electrode 50C is electrically connected to an end of the capacitor element at second principal surface 31B and fourth principal surface 31D.

To reduce the ESL, a plurality of second external electrodes 50B and/or fourth external electrodes 50D may be disposed on the bottom surface and/or the side surfaces. In this case, at least one of second external electrode 50B and/or fourth external electrode 50D may be disposed near first external electrode 50A, and at least one of the other external electrodes may be disposed near third external electrode 50C. This can effectively reduce the ESL. Minimum value $D_1$ of the separation distance between first external electrode 50A and second external electrode 50B (fourth external electrode 50D) and minimum value $D_2$ of the separation distance between third external electrode 50C and second external electrode 50B (fourth external electrode 50D) may range, for example, from 0.4 mm to 1.1 mm, inclusive.

FIGS. 20 to 23 are diagrams each illustrating an example of the pattern of first external electrode 50A, second external electrode 50B, third external electrode 50C, and fourth external electrode 50D formed on the surface of an electrolytic capacitor having a plurality of second external electrodes and fourth external electrodes. FIGS. 20 to 23 are diagrams illustrating the configurations illustrated in FIGS. 14 and 16 to 18, respectively, in which second external electrode 50B and fourth external electrode 50D extending in the direction from first principal surface 31A toward third principal surface 31C are respectively divided in the direction, one of them is disposed near first external electrode 50A, and the other is disposed near third external electrode 50C.

The external shapes of external electrodes 50A to 50D illustrated in FIGS. 14 to 23 can also be adopted for the structures of electrolytic capacitor 101 illustrated in FIGS. 8A and 8B and electrolytic capacitor 102 illustrated in FIGS. 10A and 10B.

The electrolytic capacitor according to the present disclosure can be used for various applications in which high capacitance and low ESL are required.

The invention claimed is:

1. An electrolytic capacitor comprising:
   an element stack body including a plurality of capacitor elements;
   an exterior body that seals the element stack body;
   a first external electrode; and
   a second external electrode,
   wherein:
   each of the plurality of capacitor elements includes:
      an anode body having a porous part on a surface of the anode body;
      a dielectric layer disposed on at least a part of a surface of the porous part; and
      a cathode part covering at least a part of the dielectric layer,
   the exterior body includes a first principal surface, a second principal surface intersecting the first principal surface, a third principal surface opposite to the first principal surface, and a fourth principal surface opposite to the second principal surface,
   in at least one first capacitor element among the plurality of capacitor elements, an end surface of an end of the anode body is exposed from the exterior body at least on the first principal surface to be electrically connected to the first external electrode, and an end surface of an end of the cathode part is exposed from the exterior body at least on the second principal surface to be electrically connected to the second external electrode,
   the end of the anode body includes a pair of first ends opposite to each other in a first direction,
   the end of the cathode part includes a pair of second ends opposite to each other in a second direction intersecting the first direction,
   in the at least one the first capacitor element, a first end surface A that is one end surface of the pair of first ends is exposed from the exterior body on the first principal surface to be electrically connected to the first external electrode, and a second end surface A that is one end surface of the pair of second ends is exposed from the exterior body on the second principal surface to be electrically connected to the second external electrode,
   the plurality of capacitor elements further include at least one third capacitor element, a fourth end surface A that is another end surface of the pair of second ends of the at least one first capacitor element is not exposed from the exterior body on the fourth principal surface, in the at least one third capacitor element, a second end surface C that is one end surface of the pair of second ends is not exposed from the exterior body on the second principal surface, and a fourth end surface C that is another end surface of the pair of second ends is exposed from the exterior body on the fourth principal surface, in the element stack body, the at least one first capacitor element and the at least one third capacitor element are alternately stacked, and the fourth end surface C of the at least one third capacitor element is electrically connected to a fourth external electrode.

2. The electrolytic capacitor according to claim 1, wherein in the at least one first capacitor element, the end surface of the cathode part that is exposed from the exterior body on the second principal surface is located closer to the first principal surface than to the third principal surface.

3. The electrolytic capacitor according to claim 1, wherein a third end surface A that is another end surface of the pair of first ends of the first capacitor element is exposed from the exterior body on the third principal surface to be electrically connected to a third external electrode.

4. The electrolytic capacitor according to claim 1, wherein:

the plurality of capacitor elements further include at least one second capacitor element, a third end surface A that is another end surface of the pair of first ends of the at least one first capacitor element is not exposed from the exterior body on the third principal surface, in the at least one second capacitor element, a first end surface B that is one end surface of the pair of first ends is not exposed from the exterior body on the first principal surface, and a third end surface B that is another end surface of the pair of first ends is exposed from the exterior body on the third principal surface, in the element stack body, the at least one first capacitor element and the at least one second capacitor element are alternately stacked, and the third end surface B of the at least one second capacitor element is electrically connected to a third external electrode.

5. The electrolytic capacitor according to claim 1, wherein a fourth end surface A that is another end surface of the pair of second ends of the at least one first capacitor element is exposed from the exterior body on the fourth principal surface to be electrically connected to a fourth external electrode.

6. The electrolytic capacitor according to claim 1, wherein the anode body has a recess recessed in the second direction.

7. The electrolytic capacitor according to claim 6, wherein the pair of second ends extend to protrude from the recess of the anode body.

8. The electrolytic capacitor according to claim 1, wherein in the at least one first capacitor element, the second end surface A that is an end surface of the end of the cathode part at the second principal surface is exposed from the exterior body to be electrically connected to the second external electrode, and a fourth end surface A that is an end surface of the end of the cathode part on the fourth principal surface is exposed from the exterior body to be electrically connected to the second external electrode.

9. The electrolytic capacitor according to claim 1, wherein a separation distance between the first principal surface and the third principal surface is shorter than a separation distance between the second principal surface and the fourth principal surface.

10. The electrolytic capacitor according to claim 1, wherein a separation distance between the first principal surface and the third principal surface is longer than a separation distance between the second principal surface and the fourth principal surface.

11. The electrolytic capacitor according to claim 1, wherein at least one of the first external electrode or the second external electrode includes a plurality of electrode portions disposed apart from each other, the plurality of electrode portions being disposed along the first principal surface or the second principal surface.

12. An electrolytic capacitor comprising:
an element stack body including a plurality of capacitor elements;
an exterior body that seals the element stack body;
a first external electrode; and
a second external electrode,
wherein:
each of the plurality of capacitor elements includes:
an anode body having a porous part on a surface of the anode body;
a dielectric layer disposed on at least a part of a surface of the porous part; and
a cathode part covering at least a part of the dielectric layer,
the exterior body includes a first principal surface, a second principal surface intersecting the first principal surface, a third principal surface opposite to the first principal surface, and a fourth principal surface opposite to the second principal surface,
in at least one first capacitor element among the plurality of capacitor elements, an end surface of an end of the anode body is exposed from the exterior body at least on the first principal surface to be electrically connected to the first external electrode, and an end surface of an end of the cathode part is exposed from the exterior body at least on the second principal surface to be electrically connected to the second external electrode,
the end of the anode body is not exposed from the third principal surface of the exterior body,
a third end surface A that is an end surface of the end of the cathode part at the third principal surface is exposed from the exterior body, and
the third end surface A is electrically connected to a third external electrode.

13. An electrolytic capacitor comprising:
an element stack body including a plurality of capacitor elements;
an exterior body that seals the element stack body;
a first external electrode; and
a second external electrode,
wherein:
each of the plurality of capacitor elements includes:
an anode body having a porous part on a surface of the anode body;
a dielectric layer disposed on at least a part of a surface of the porous part; and
a cathode part covering at least a part of the dielectric layer,
the exterior body includes a first principal surface, a second principal surface intersecting the first principal surface, a third principal surface opposite to the first principal surface, and a fourth principal surface opposite to the second principal surface, in at least one first capacitor element among the plurality of capacitor elements, an end surface of an end of the anode body is exposed from the exterior body at least on the first principal surface to be electrically connected to the first external electrode, and an end surface of an end of the cathode part is exposed from the exterior body at least on the second principal surface to be electrically connected to the second external electrode, and neither the end of the anode body nor the end of the cathode part is exposed from the third principal surface of the exterior body.

14. The electrolytic capacitor according to claim 13, wherein a third external electrode is disposed to cover a bottom surface of the electrolytic capacitor on a side closer to the third principal surface than the second external electrode.

15. An electrolytic capacitor comprising:
an element stack body including a plurality of capacitor elements;
an exterior body that seals the element stack body;
a first external electrode; and
a second external electrode,
wherein:
each of the plurality of capacitor elements includes:
an anode body having a porous part on a surface of the anode body;
a dielectric layer disposed on at least a part of a surface of the porous part; and
a cathode part covering at least a part of the dielectric layer, the exterior body includes a first principal surface, a second principal surface intersecting the first principal surface, a third principal surface opposite to the first principal surface, and a fourth principal surface opposite to the second principal surface, in at least one first capacitor element among the plurality of capacitor elements, an end surface of an end of the anode body is exposed from the exterior body at least on the first principal surface to be electrically connected to the first external electrode, and an end surface of an end of the cathode part is exposed from the exterior body at least on the second principal surface to be electrically connected to the second external electrode, the cathode part includes a solid electrolyte layer covering at least a part of the dielectric layer, in at least one of the plurality of capacitor elements, the cathode part further includes a cathode foil that covers at least a part of the solid electrolyte layer, a part of the cathode foil covers the solid electrolyte layer, and a remaining part of the cathode foil that does not cover the solid electrolyte layer constitutes the end of the cathode part, the cathode foil is a sintered foil, a vapor deposited foil, or a coated foil, and a surface of a metal foil of the sintered foil, the vapor deposited foil, or the coated foil is covered with a conductive film.

16. The electrolytic capacitor according to claim 15, wherein the conductive film is at least one selected from the group consisting of Ti, TiC, TiO, and C (carbon) films.

17. A method for producing an electrolytic capacitor, the electrolytic capacitor including an element stack body including a plurality of capacitor elements each including an anode body having a porous part on a surface of the anode body, a dielectric layer formed on at least a part of a surface of the porous part, and a cathode part covering at least a part of the dielectric layer, the method comprising:

obtaining an element assembly in which a plurality of element stack bodies are arrayed on a plane perpendicular to a stacking direction, each of the plurality of element stack bodies being the element stack body;

dividing the element assembly into the plurality of element stack bodies; and electrically connecting an end of the anode body of the element stack body to a first external electrode and electrically connecting an end of the cathode part of the element stack body to a second external electrode, wherein:
the obtaining of the element assembly includes:
(i) preparing an anode foil including the porous part formed on a surface of the anode foil;
(ii) forming the dielectric layer on the surface of the anode foil;
(iii) forming a first opening in the anode foil;
(iv) forming a solid electrolyte layer in a first region of the anode foil;
(v) preparing a cathode foil processed into a shape having a second region partially facing the first region; and
(vi) alternately stacking the anode foil and the cathode foil, each of the first region of the anode foil and the second region of the cathode foil has an arrangement pattern including a periodic pattern in which a unit pattern is periodically repeated in at least one of a first direction or a second direction intersecting the first direction, the unit pattern of the first region includes a region $A_1$ located at a center in the first direction and a region $A_2$ extending in the first direction from the region $A_1$, and the unit pattern of the second region includes a region $A_3$ corresponding to the region $A_1$ of the anode foil and a region $A_4$ extending in the second direction from the region $A_3$.

18. The method for producing an electrolytic capacitor according to claim 17, further comprising, after step (iii) and before step (iv), forming an insulating layer on an end surface of the anode foil exposed at the first opening.

19. The method for producing an electrolytic capacitor according to claim 17, wherein:
the unit pattern of the second region includes a region $A_5$ extending in the first direction from the region $A_3$, and
at least a part of the region $A_5$ overlaps the region $A_2$ of the anode foil.

20. The method for producing an electrolytic capacitor according to claim 17, wherein the unit pattern of the first region includes a region $A_7$ extending from the region $A_1$ to a side opposite to the region $A_2$ in the first direction.

21. The method for producing an electrolytic capacitor according to claim 20, wherein the unit pattern of the first region has a recess recessed in the second direction, the recess having a shape along an edge of the first opening.

22. The method for producing an electrolytic capacitor according to claim 20, wherein:
the obtaining of the element assembly includes:
obtaining a first anode foil by forming a second opening that extends in the second direction and is arranged in a first pattern; and obtaining a second anode foil by forming the second opening that is arranged in a second pattern different from the first pattern, in the first pattern, the second opening is formed in a region that is outside the first region and is opposite to the region $A_1$ with respect to the region $A_2$ or in a region that is outside the first region and is opposite to the region $A_1$ with respect to the region $A_7$, in the second pattern, the second opening is formed in a region corresponding to a region where the second opening is not formed in the first pattern, the region being outside the first region and being opposite to the region $A_1$ with respect to the region $A_2$ or in a region corresponding to a region where the second opening is not formed in the first pattern, the region being outside the first region and being opposite to the region $A_1$ with respect to the region $A_7$, and in step (vi), the first anode foil, the cathode foil, the second anode foil, and the cathode foil are stacked in this order.

23. The method for producing an electrolytic capacitor according to claim 17, the method further comprising:

obtaining a first cathode foil in which the region $A_4$ extends in one direction along the second direction from the region $A_3$; and obtaining a second cathode foil in which the region $A_4$ extends in another direction along the second direction from the region $A_3$, wherein in step (vi), the anode foil, the first cathode foil, the anode foil, and the second cathode foil are stacked in this order.

24. The method for producing an electrolytic capacitor according to claim 23, wherein:

the first cathode foil does not include a region $A_6$ extending in the another direction along the second direction from the region $A_3$ or has an extension distance of a region $A_6$ in the another direction along the second direction from the region $A_3$ shorter than an extension distance of the region $A_4$ in the one direction along the second direction from the region $A_3$, and the second cathode foil does not include the region $A_6$ extending in the one direction along the second direction from the region $A_3$ or has an extension distance of the region $A_6$ in the one direction along the second direction from the region $A_3$ shorter than an extension distance of the region $A_4$ in the another direction along the second direction from the region $A_3$.

25. The method for producing an electrolytic capacitor according to claim 17, wherein the second region includes a region $A_6$ extending from the region $A_3$ in a direction opposite to a direction in which the region $A_4$ extends.

26. The method for producing an electrolytic capacitor according to claim 17, wherein:

the dividing of the element assembly includes:

(vii) filling, with an exterior body, the first opening of the anode foil and a region other than the second region of the cathode foil of the element assembly;

(viii) exposing an end surface of the anode foil on a first principal surface of the exterior body by cutting the element assembly along a cutting line that does not cross the first region and is parallel to the second direction; and (ix) exposing an end surface of the cathode foil on a second principal surface of the exterior body by cutting the element assembly along a cutting line that crosses the region $A_4$ and is parallel to the first direction.

* * * * *